US012799709B2

(12) United States Patent
Wakata

(10) Patent No.: US 12,799,709 B2
(45) Date of Patent: Nov. 17, 2026

(54) WORK MACHINE

(71) Applicant: Yanmar Holdings Co., Ltd., Osaka (JP)

(72) Inventor: Tatsumasa Wakata, Fukuoka (JP)

(73) Assignee: Yanmar Holdings Co., Ltd., Osaka (JP)

( * ) Notice: Subject to any disclaimer, the term of this patent is extended or adjusted under 35 U.S.C. 154(b) by 316 days.

(21) Appl. No.: 18/442,124

(22) Filed: Feb. 15, 2024

(65) Prior Publication Data

US 2024/0328111 A1 Oct. 3, 2024

(30) Foreign Application Priority Data

Mar. 28, 2023 (JP) ................................ 2023-051986

(51) Int. Cl.

*E02F 9/08* (2006.01)
*B60K 26/00* (2006.01)
*F01N 3/021* (2006.01)

(52) U.S. Cl.

CPC ............ *E02F 9/0866* (2013.01); *B60K 26/00* (2013.01); *E02F 9/0883* (2013.01); *E02F 9/0891* (2013.01); *F01N 3/021* (2013.01)

(58) Field of Classification Search

CPC ....... E02F 9/0866; E02F 9/2058; B60K 26/00
See application file for complete search history.

(56) References Cited

U.S. PATENT DOCUMENTS

2008/0035401 A1* 2/2008 Ishii ...................... E02F 9/0866 137/625
2021/0062468 A1 3/2021 Wu et al.

FOREIGN PATENT DOCUMENTS

| | | | |
|---|---|---|---|
| EP | 2578756 A1 | | 4/2013 |
| EP | 4129730 A1 | | 2/2023 |
| EP | 4141175 A1 | | 3/2023 |
| JP | 2007211613 A | | 8/2007 |
| JP | 2013104167 A | | 5/2013 |
| JP | 2014034844 A | | 2/2014 |
| JP | 2014101660 A | * | 6/2014 |
| JP | 2015086565 A | * | 5/2015 |

OTHER PUBLICATIONS

Notice of Reasons for Refusal: Patent Application No. JP2023-051986, Proposed: Dec. 3, 2025.

* cited by examiner

*Primary Examiner* — Steve Clemmons
(74) *Attorney, Agent, or Firm* — Chris Mizumoto

(57) ABSTRACT

A work machine includes an engine, a hydraulic pump disposed on a side of the engine, an engine room that accommodates the engine and the hydraulic pump, and an engine controller included in the engine room and disposed above the hydraulic pump in a vertical direction and on a side of the engine.

11 Claims, 13 Drawing Sheets

WORK MACHINE

CROSS-REFERENCE

This application claims foreign priority of JP2023-051986 filed Mar. 28, 2023, the disclosure of which is hereby incorporated by reference in its entirety.

TECHNICAL FIELD

The present disclosure relates to a work machine including an electrical component, such as an engine controller for controlling operation of an engine.

BACKGROUND ART

In the related art, as an example of an electrical component, work machines including an engine controller that performs control related to operation of an engine, such as fuel injection control and rotation speed control of the engine, have been used (for example, refer to Patent Document 1).

Patent Document 1 discloses, as a configuration of a hydraulic excavator which is a kind of work machine, a configuration in which a utility room is provided between a cabin on a front side and an engine room on a rear side on a machine body frame, a front partition cover forming a front wall surface of the utility room is disposed on a rear side of the cabin, and an engine controller is attached to the front partition cover. The configuration disclosed in Patent Document 1 is intended to protect the engine controller from temperature changes and vibrations in the vicinity of the engine and to improve maintainability by disposing the engine controller in the utility room.

PRIOR ART DOCUMENT

Patent Document

Patent Document 1: Japanese Unexamined Patent Application Publication No. 2007-170129

SUMMARY OF INVENTION

Technical Problem

For example, in a relatively small-sized work machine, such as a small-sized shovel, a utility room as disclosed in Patent Document 1 is not provided, and for example, an engine room also serving as a utility room is provided immediately behind an operation section covered with a cabin or the like, and moreover, a space for the engine room is narrowly limited. Therefore, there is a problem in that it is difficult to efficiently install an electrical component in the engine room in consideration of the maintainability of the electrical component, such as the engine controller, and the connectivity with the related devices while a space for reclining a driver's seat is secured in order to obtain comfort in the operation section.

The present disclosure has been made in view of the problems as described above, and it is an object of the present disclosure to provide a work machine capable of ensuring comfort in an operation section and efficiently arranging an electrical component in an engine room while obtaining good maintainability.

Solution to Problem

According to an aspect of the present disclosure, a work machine includes an engine, a hydraulic pump disposed on a side of the engine, an engine room that accommodates the engine and the hydraulic pump, and an electrical component included in the engine room and disposed above the hydraulic pump in a vertical direction and on a side of the engine.

The work machine may further include a cooling portion that cools at least one of cooling water of the engine and oil pumped by the hydraulic pump, and the electrical component may be disposed on a side opposite to a side on which the cooling portion is disposed with respect to the engine.

In the work machine, the cooling portion may include a fan that sends air toward the engine.

In the work machine, an opening portion that allows an inside and an outside of the engine room to communicate with each other may be provided below the hydraulic pump.

In the work machine, a tank that stores the oil pumped by the hydraulic pump may be disposed in front of the engine in a front-rear direction.

The work machine may further include an exhaust treatment device that is disposed above the engine and treats exhaust gas discharged from the engine, and the electrical component may be disposed on a side near the exhaust treatment device.

In the work machine, a wall portion on a front side of the engine room may have an inclined surface portion inclined in a direction from a front side to a rear side from a lower side to an upper side, and the electrical component may be attached to the inclined surface portion.

In the work machine, the electrical component may be an engine controller that controls operation of the engine.

Advantageous Effects of Invention

According to the present disclosure, comfort in an operation section can be secured, and an electrical component can be efficiently arranged in an engine room while favorable maintainability is attained.

DESCRIPTION OF EMBODIMENTS

The present disclosure is made to improve maintainability of an electrical component while comfort in an operation section is attained by devising arrangement of the electrical component in an engine room storing an engine. Hereinafter, an embodiment of the present disclosure will be described with reference to the accompanying drawings.

In the embodiment of the present disclosure, the description is to be made on an excavation work machine (shovel), which is a swivel work vehicle, as an example of a work machine according to the present disclosure. Note that, a work machine according to the present disclosure is not limited to the excavation work machine, and is widely applicable to other types of work machine, such as a bulldozer, a crane work machine, a compact truck loader, a skid steer loader, and a wheel loader.

Figure 1:
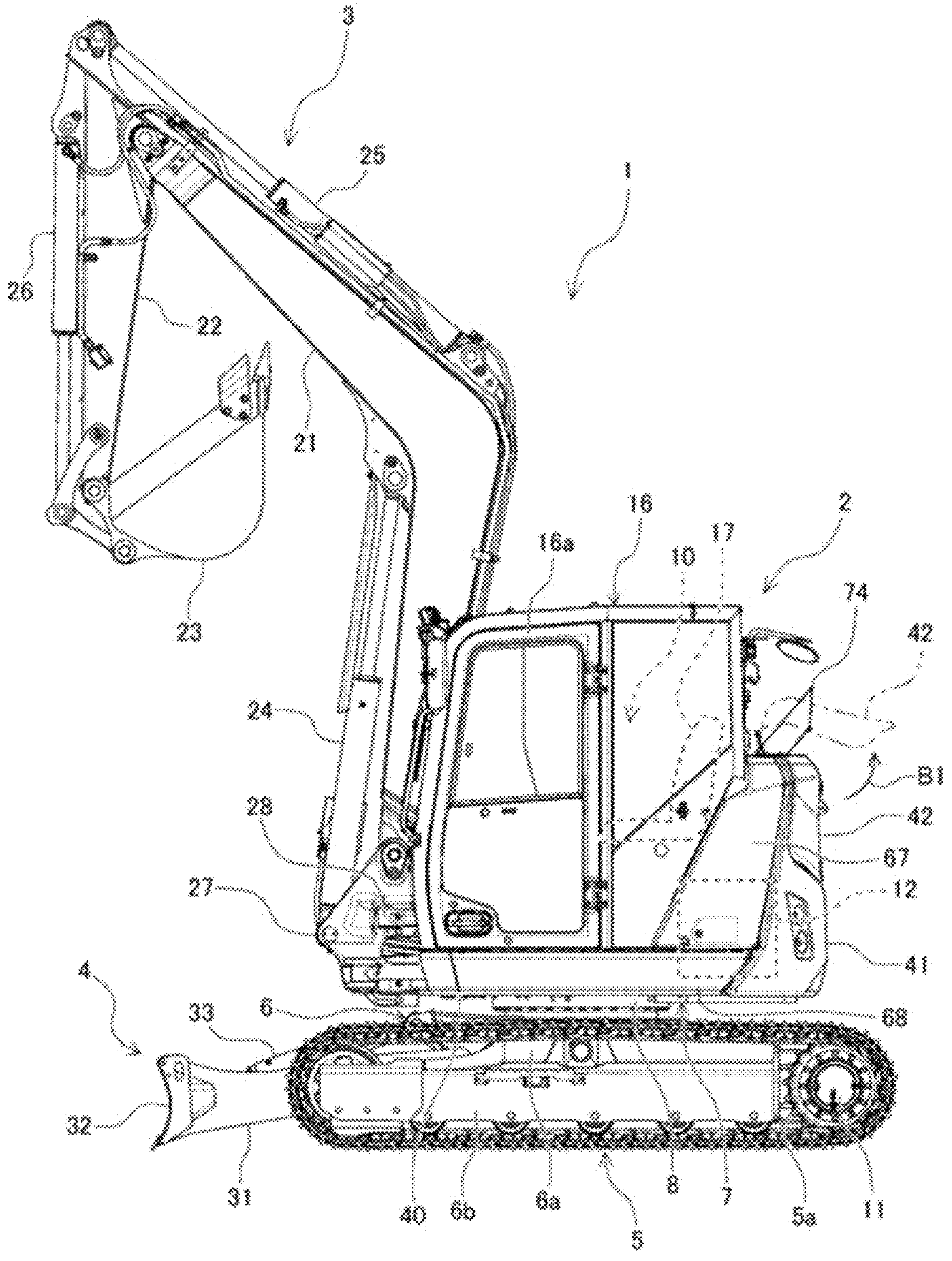
FIG. 1 is a left side view of an excavation work machine according to an embodiment of the present disclosure.
Figure 2:
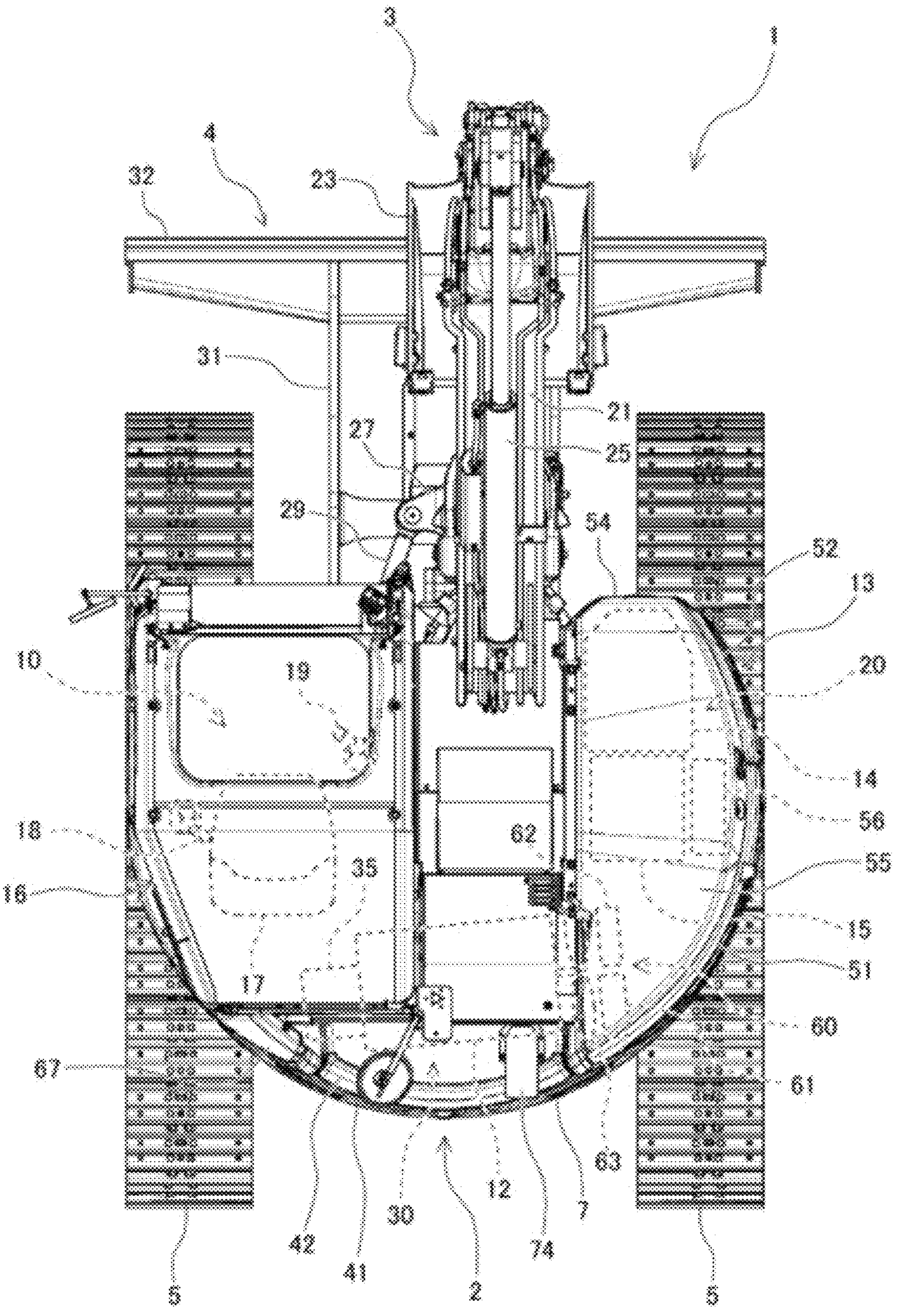
FIG. 2 is a plan view of the excavation work machine according to the embodiment of the present disclosure.
Figure 3:
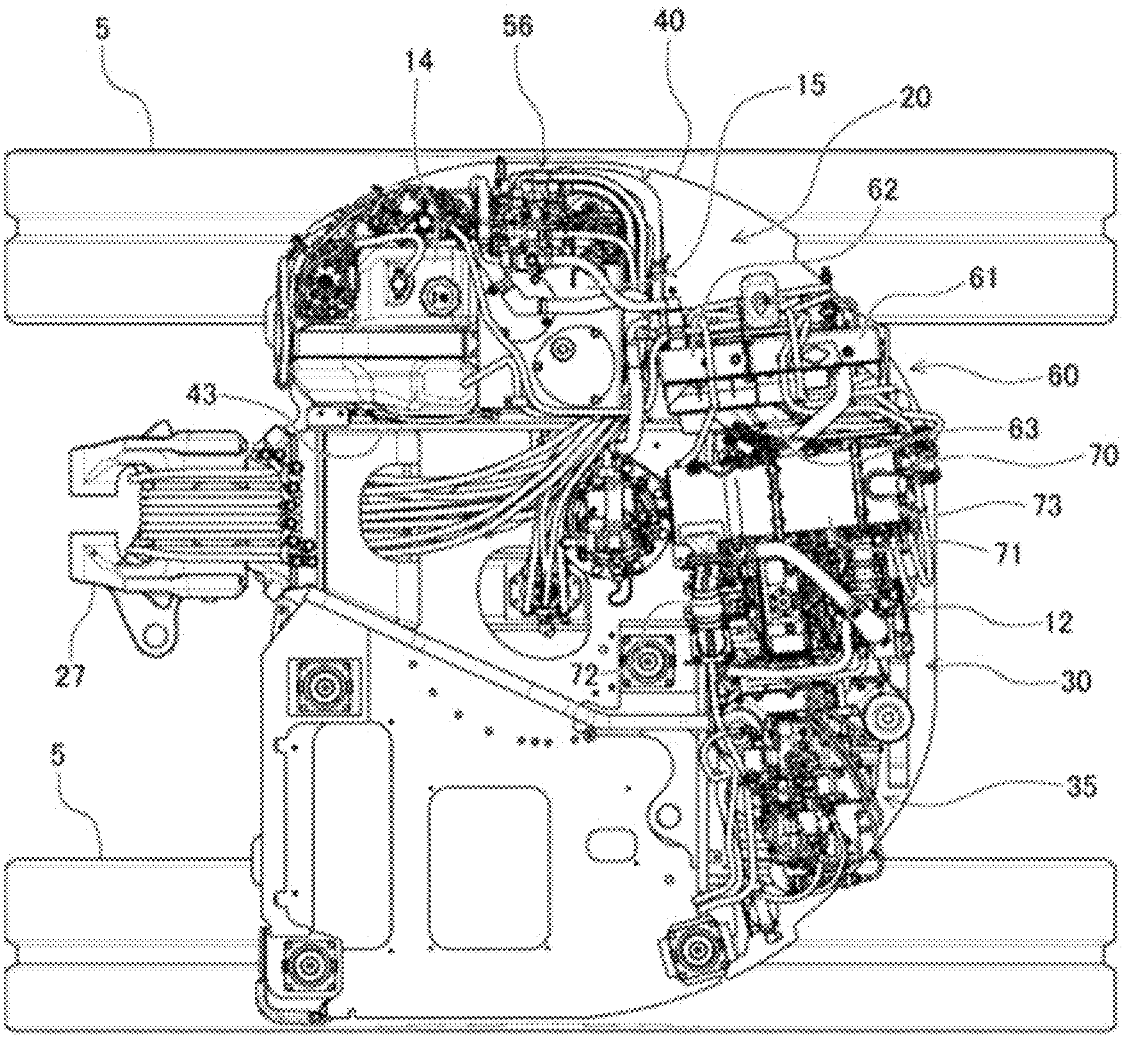
FIG. 3 is a plan view illustrating an arrangement configuration of devices on a base plate of the excavation work machine according to the embodiment of the present disclosure.

A description will be made on an overall configuration of an excavation work machine 1 according to the embodiment with reference to FIGS. 1 to 3. Note that, in the following description, a left side and a right side relative to a front (the left in FIG. 1) of the excavation work machine 1 are referred to as a left side and a right side of the excavation work machine 1, respectively. As illustrated in FIGS. 1 and 2, the excavation work machine 1 includes a traveling device 2 as a self-propelled traveling body, and an excavation device 3 and a soil removal device 4 which are work portions mounted on the traveling device 2.

The traveling device 2 serves as a main machine of the excavation work machine 1 and has a pair of crawler-type traveling sections 5 on the right and left, a machine body frame 6 serving as a base stand installed between the right and left traveling sections 5, and a swivel frame 7 installed on the machine body frame 6.

Each of the traveling sections 5 has a configuration in which a crawler is wound around a plurality of rotating bodies, such as sprockets and rollers, supported by the machine body frame 6. Each of the traveling sections 5 has, at a rear end thereof, a drive sprocket 5*a* as a drive wheel. The machine body frame 6 has a center frame section 6*a* positioned in a middle part between the right and left traveling sections 5 and side frame sections 6*b* disposed on both right and left sides of the center frame section 6*a*.

Each of the traveling sections 5 has a traveling hydraulic motor 11. The traveling hydraulic motor 11 is attached in a predetermined portion, such as the side frame section 6*b* of the machine body frame 6, in a corresponding one of the traveling sections 5 so as to rotationally drive the drive sprocket 5*a*. Each of the left and right traveling hydraulic motors 11 drives a corresponding one of the traveling sections 5 so that the traveling device 2 travels straightly back and forth or swivels and travels to the left and right.

The swivel frame 7 is coupled to the machine body frame 6 via a swivel support section 8 including a swivel bearing disposed on an upper side of the center frame section 6*a*, and can be swiveled in either left or right direction about a vertical axis. The swivel frame 7 is swiveled by driving of a swivel motor (not illustrated) which is a hydraulic motor for swiveling.

An operation section 10 is provided on the swivel frame 7. Furthermore, a prime mover section including an engine 12 as a drive source is disposed on a rear portion on the swivel frame 7. On a right side of the operation section 10, a tank accommodation section 13 accommodating a fuel tank 14 and a hydraulic oil tank 15 is disposed (refer to FIG. 2).

The operation section 10 is used to drive and operate the traveling device 2, the excavation device 3, and the soil removal device 4, and is disposed in a cabin 16 installed on the swivel frame 7. The cabin 16 has a frame that forms an outline thereof and a plurality of window sections made of a transparent member, such as glass, and is configured as a whole in a substantially box shape. The cabin 16 has, in a left side surface portion, an openable door 16*a* that opens and closes an entrance for an operator to the operation section 10.

In the cabin 16, a driver's seat 17 is disposed on a driver's seat support base disposed on a floor portion. A traveling manipulation unit, such as a traveling lever, a work manipulation unit, such as a work manipulation lever for operating work sections, such as the excavation device 3 and the soil removal device 4, an operation panel unit having various manipulation units, such as switches, and the like are disposed near the driver's seat 17.

Regarding the work manipulation unit, a left side work manipulation lever 18 is disposed on a left side of the driver's seat 17, and a right work operation lever 19 is disposed on a right side of the driver's seat 17 (refer to FIG. 2). The excavation device 3 is operated by the right and left manipulation levers.

A base end portion of the excavation device 3 is mounted on a laterally-center portion of a front end of the swivel frame 7. The excavation device 3 has a boom 21 that constitutes a base end portion thereof, an arm 22 that is coupled to a tip end side of the boom 21, and a bucket 23 that is attached to a tip end portion of the arm 22. Furthermore, the excavation device 3 has a boom cylinder 24 that rotates the boom 21, an arm cylinder 25 that rotates the arm 22, and a bucket cylinder 26 that rotates the bucket 23.

The base end portion of the boom 21 is supported by a boom support bracket 27. The boom support bracket 27 is supported by a bracket attachment section 28 protruding from a central portion in the lateral direction of a front end of the swivel frame 7 via a swing shaft with a vertical direction as a rotation axis direction. The excavation device 3 is disposed to swing to the right and left about the swing shaft with respect to the swivel frame 7 by an expansion and contraction movement of a swing cylinder 29 disposed between the boom support bracket 27 and the swivel frame 7. The boom cylinder 24, the arm cylinder 25, and the bucket cylinder 26 that are included in the excavation device 3 and the swing cylinder 29 that swings the excavation device 3 are each a hydraulic cylinder actuated by pressure oil discharged by a hydraulic pump 35.

The soil removal device 4 is attached to a front side of the machine body frame 6. The soil removal device 4 has a support frame 31 that includes a pair of right and left arms, each of which extends in a front-rear direction between the right and left traveling sections 5, a blade 32 as a soil removal plate disposed on a tip end side of the support frame 31, and a blade cylinder 33 that lifts/lowers the blade 32 via the support frame 31. The blade cylinder 33 is a hydraulic cylinder operated by pressure oil discharged from the hydraulic pump 35.

The support frame 31 is attached to the machine body frame 6 so as to be lifted and lowered in a rotatable manner, by having a rear end portion of the right and left arms supported in a rotatable manner by a support bracket disposed in a front portion of the machine body frame 6 with the lateral direction as a rotation axis direction. The blade 32 is installed in a state of being supported by a front end portion of the support frame 31. The blade cylinder 33 is disposed in a state of being hung in the front-rear direction between the machine body frame 6 and a back side of the blade 32.

The excavation work machine 1 includes a lower traveling body, which is configured to include the machine body frame 6 and the traveling sections 5 supported on both the left and right sides of the machine body frame 6, and an upper swivel body mounted on the lower traveling body in a swiveling available manner. The upper swivel body includes the swivel frame 7, and the operation section 10, the engine 12, and the tank accommodation section 13 disposed on the swivel frame 7.

A counterweight 41 is disposed in a rear lower portion of the swivel frame 7. A hood 42 serving as a cover body is disposed on an upper side of the counterweight 41 so as to be openable and closable. The hood 42 constitutes a cover portion that covers a rear side of the swivel frame 7. The counterweight 41 and the hood 42 are configured to be bilaterally symmetrical or substantially bilaterally symmetrical.

In the excavation work machine 1 having the above-described configuration, an operator who is seated on the driver's seat 17 properly operates the traveling lever, the work manipulation lever, or the like, to perform a desired action or a desired work. Specifically, for example, when the traveling lever is operated, the traveling device 2 travels straight forward and backward or turns right and left by operating the right and left traveling sections 5. Furthermore, when the work operation lever is operated, the excavation work by the excavation device 3, or the soil removal work or ground leveling work by the soil removal device 4 is performed.

Hereinafter, various device configurations disposed on the swivel frame 7 will be described with reference to FIGS. 2 to 13. Note that, in FIG. 4, the hood 42 is omitted.

On the base plate 40 included in the swivel frame 7, the tank accommodation section 13 is disposed in a portion of a right region on the base plate 40. The base plate 40 is a plate-like frame member horizontally disposed, and forms a bottom surface portion of the swivel frame 7.

The tank accommodation section 13 is configured such that the fuel tank 14, the hydraulic oil tank 15, and the like are accommodated in a tank chamber 20 sectioned on the base plate 40. The tank chamber 20 is sectioned from a portion on a center side in the lateral direction on the base plate 40 by a bulkhead portion including a portion of a vertical plate 43 disposed on the base plate 40.

The rear side of the tank chamber 20 is spatially continuous with an engine room 30 that accommodates the engine 12 disposed at a rear portion on the base plate 40. An intermediate portion in the lateral direction on a rear side of the engine room 30 is covered with a counterweight 41 and the hood 42. The cabin 16 is disposed on a left side of the tank chamber 20 on the swivel frame 7.

In the tank accommodation section 13, a portion on the right side of the vertical plate 43 on the base plate 40 is covered with a plurality of exterior covers which are covering members so that the tank chamber 20 serving as an accommodation space is formed. Each of the plurality of exterior covers has a shape and a size corresponding to a shape of the swivel frame 7 and the arrangement of the configurations on the swivel frame 7.

The tank accommodation section 13 has, as the exterior covers, a right rear cover 51 that covers a right lateral rear portion of the tank chamber 20, a right front cover 52 that covers a right lateral front portion of the tank chamber 20, a right lower cover 53 that covers a right lower portion of the tank chamber 20, and a front cover 54 that covers a front portion of the tank chamber 20. These covers are, for example, metal covers. The tank accommodation section 13 further has an upper surface cover 55 that is a cover member that covers an upper side of the tank chamber 20 as an exterior cover. The upper surface cover 55 is a resin cover, for example, and is disposed so as to be openable and closable.

In the tank chamber 20, the fuel tank 14 is disposed on a front portion, and the hydraulic oil tank 15 is disposed on a rear side of the fuel tank 14. The fuel tank 14 is a fuel oil tank that stores fuel oil to be supplied to the engine 12. The hydraulic oil tank 15 stores hydraulic oil for actuating various hydraulic actuators included in the excavation work machine 1. The various hydraulic actuators that are actuated by receiving supply of pressure oil from the hydraulic oil include hydraulic cylinders, such as the boom cylinder 24, the arm cylinder 25, the bucket cylinder 26, and the swing cylinder 29, as well as the traveling hydraulic motor 11 and the swivel motor.

The hydraulic oil tank 15 is disposed behind the fuel tank 14, and is located at a substantially central portion in the front-rear direction in the tank chamber 20. The fuel tank 14 and the hydraulic oil tank 15 are mounted on and supported by the base plate 40. The fuel tank 14 and the hydraulic oil tank 15 are disposed adjacent to each other in the front-rear direction. In the tank chamber 20, a control valve 56 is disposed adjacent to the hydraulic oil tank 15 on a right side of the hydraulic oil tank 15. The control valve 56 is a device for controlling a flow of the pressure oil supplied from the hydraulic oil tank 15 to the plurality of hydraulic actuators by driving the hydraulic pump 35. By controlling supply of the pressure oil to the individual hydraulic actuators, an operation of the excavation device 3, a traveling operation of the traveling device 2, and the like are performed.

The hydraulic oil tank 15 is disposed in front of the engine 12 in the front-rear direction. The hydraulic oil tank 15 is disposed at a substantially central portion of the tank chamber 20 in the front-rear direction, and is disposed at a substantially central portion in the front-rear direction of a right portion on the base plate 40. Meanwhile, the engine 12 is disposed in the engine room 30 connected to the rear side of the tank chamber 20, and is disposed at a position close to the rear end portion on the base plate 40. The hydraulic oil tank 15 is disposed in front of the heat exchanger 60 disposed on a right side of the engine 12, more specifically, at a position immediately in front of an oil cooler 62.

On the base plate 40, a heat exchanger 60 and the engine 12 are disposed in the engine room 30 connected to the rear side of the tank chamber 20. The heat exchanger 60 is disposed on a right side, which is one side of the engine 12 in the lateral direction. The heat exchanger 60 is a device configuration having a heat exchange function for cooling the engine 12, and includes a radiator 61, the oil cooler 62, and a fan 63.

The radiator 61 is a device for cooling cooling water of the engine 12. The oil cooler 62 is a device for cooling oil (hydraulic oil) pumped by the hydraulic pump 35. Each of the radiator 61 and the oil cooler 62 has a substantially cuboid outer shape so as to have a substantially rectangular shape in a plan view. In the plan view, the radiator 61 and the oil cooler 62 are arranged side by side in the front-rear direction, with the radiator 61 on the rear side and the oil cooler 62 on the front side, in a direction in which a longitudinal direction is perpendicular or substantially perpendicular to an axial direction of an output shaft 65 of the engine 12.

The fan 63 is a cooling fan that rotates in conjunction with the engine 12, and sends air toward the engine 12. The fan 63 is disposed between a right side surface portion of the engine 12 and the radiator 61 and the oil cooler 62. Outside air for cooling is taken into the engine room 30 through a plurality of opening portions 51*a* (refer to FIG. 4) formed in the right rear cover 51 by the fan 63 so that the radiator 61, the oil cooler 62, and the like are cooled.

The engine 12 is installed in a rear portion of the base plate 40 with the axial direction of the output shaft 65 corresponding to substantially the lateral direction or corresponding to the lateral direction. That is, the engine 12 is transversely disposed and mounted such that the axial direction of the output shaft 65 substantially coincides with or coincides with the lateral direction of the machine body.

In this embodiment, the engine 12 is transversely disposed such that the axial direction of the output shaft 65 is inclined by approximately 5 degrees to 8 degrees in a counterclockwise direction from the lateral direction in the plan view. The engine 12 is disposed in a state of being supported in a vibration-damping manner at a plurality of positions via a vibration-damping member 66 and the like with respect to a predetermined engine support portion disposed on the base plate 40.

The output shaft 65 of the engine 12 protrudes to the right side, which is one side in the lateral direction of the machine body. The output shaft 65 is located at a lower portion of a right side surface of the engine 12 substantially at the center in the front-rear direction (refer to FIG. 5). The engine 12 is a diesel engine that receives fuel supplied from the fuel tank 14.

The hydraulic pump 35 is disposed on a left side, which is the other side of the engine 12 in the lateral direction. That is, the hydraulic pump 35 is disposed on a side opposite to the protruding side of the output shaft 65 in the axial direction of the output shaft 65 of the engine 12. A rotation shaft of the hydraulic pump 35 is connected to a drive shaft of the engine 12 via a coupling. The hydraulic pump 35 is driven by the rotation of the drive shaft of the engine 12, and feeds the hydraulic oil in the hydraulic oil tank 15 to the various hydraulic actuators via the control valve 56.

An exhaust gas purification device 70 for purifying exhaust gas discharged from the engine 12 is disposed for the engine 12. The exhaust gas purification device 70 is an example of an exhaust treatment device that is disposed above the engine 12 and treats exhaust gas discharged from the engine 12. Combustion gas generated in a combustion chamber of the engine 12 is discharged out of the engine room 30 through the exhaust gas purification device 70.

The exhaust gas purification device 70 includes a DPF case 71, which is a diesel particulate filter case, as a cylindrical filter case into which the exhaust gas discharged from the engine 12 is introduced. The exhaust gas purification device 70 introduces exhaust gas discharged from the engine 12 into the DPF case 71 and removes particulate matter, such as soot contained in the exhaust gas, thereby purifying the exhaust gas.

The DPF case 71 has a diesel oxidation catalyst and a soot filter in the case. The diesel oxidation catalyst is an oxidation catalyst, such as platinum, that generates nitrogen dioxide (NO2). The soot filter has a honeycomb structure that continuously oxidizes and removes trapped particulate matter at a relatively low temperature. In the DPF case 71, the diesel oxidation catalyst and the soot filter are arranged in series with respect to a flow of the exhaust gas, with the diesel oxidation catalyst on an upstream side and the soot filter on a downstream side. The diesel oxidation catalyst and the soot filter remove the particulate matter mainly including black smoke in the exhaust gas of the engine 12 passing through the DPF case 71, and reduce carbon monoxide (CO) and hydrocarbon (HC) in the exhaust gas.

The DPF case 71 is configured as a substantially cylindrical case. In the DPF case 71, a longitudinal direction (cylinder axis direction) of a substantially cylindrical outer shape corresponds to a direction of the flow of the exhaust gas in the case. The DPF case 71 is disposed in a direction in which the longitudinal direction thereof is the front-rear direction or a substantially front-rear direction of the machine body. In this embodiment, the DPF case 71 is disposed such that the longitudinal direction thereof is orthogonal to the axial direction of the output shaft 65 of the engine 12 in the plan view. A mounting plate 71*c* that is removed when a filter inside the DPF case 71 is replaced is disposed on an end surface portion on a rear side of the DPF case 71. The filter in the DPF case 71 can be removed by removing the mounting plate 71*c*.

The DPF case 71 is disposed above the engine 12. The DPF case 71 has substantially the same size as the engine 12 in the front-rear direction, and is disposed such that the entire DPF case 71 is substantially positioned above the engine 12. The DPF case 71 is disposed above a right portion of the engine 12 in the lateral direction.

The DPF case 71 is fixed to and supported by the engine 12 at two front and rear positions by means of a front support stay 75 and a rear support stay 76, respectively. The front support stay 75 is fixed to a front portion of an upper right portion of the engine 12, protrudes upward from the engine 12, supports a front portion of the DPF case 71 from below, and holds the front portion of the DPF case 71 together with a holding belt 77 extending along an outer peripheral surface of the DPF case 71. The rear support stay 76 is fixed to a rear portion of the upper right portion of the engine 12, protrudes upward from the engine 12, and is fixed to a lower portion of a flange portion 71*a* disposed on a rear portion of the DPF case 71 by bolts or the like, thereby supporting the rear portion of the DPF case 71 from below.

One end side (downstream side) of an exhaust pipe 72 that discharges exhaust gas from the engine 12 is communicatively coupled to the DPF case 71. The DPF case 71 is coupled to one end of the exhaust pipe 72 on a left side of a front portion thereof. The other end side (upstream side) of the exhaust pipe 72 is communicatively coupled to an exhaust gas outlet side of a turbocharger (not illustrated) disposed on an exhaust manifold constituting an exhaust gas outlet portion in the engine 12. Exhaust gas in the engine 12 is introduced into the DPF case 71 through the exhaust pipe 72.

An outlet pipe 73 for discharging the exhaust gas in the DPF case 71 is disposed on a rear portion of the DPF case 71. The outlet pipe 73 protrudes upward from an upper side of the DPF case 71. The outlet pipe 73 penetrates a horizontal upper surface portion 42*a* of the hood 42 and protrudes upward from the upper surface portion 42*a*. A tail pipe 74 constituting a discharge pipe portion of the exhaust gas purification device 70 together with the outlet pipe 73 is attached to the upper surface portion 42*a* of the hood 42.

The counterweight 41 has an opening portion 150 that covers the engine room 30 from the rear side and exposes the engine room 30 to the outside. The counterweight 41 includes a shielding main body portion 151 having a substantially trapezoidal outer shape in a rear view of the machine body, and projecting portions 152 extending upward from both left and right ends of the shielding main body portion 151 and forming the opening portion 150 together with the shielding main body portion 151.

A right edge portion of the counterweight 41 abuts on an edge portion on a rear side of the right rear cover 51. Furthermore, a lower end portion of the right edge portion of the counterweight 41 abuts on a rear edge portion of the right lower cover 53. A left edge portion of the counterweight 41 abuts on an edge portion on the rear side of a left rear cover 67 which is an exterior cover disposed on a left rear side of the cabin 16. Furthermore, a lower edge portion of the left edge portion of the counterweight 41 abuts on a rear edge portion of the lower left cover 68 that is an exterior cover. The lower left cover 68 is disposed so as to be continuous with a lower side of the left side surface portion of the cabin 16, and is configured so as to be substantially bilaterally symmetrical to the right lower cover 53.

Figure 7:
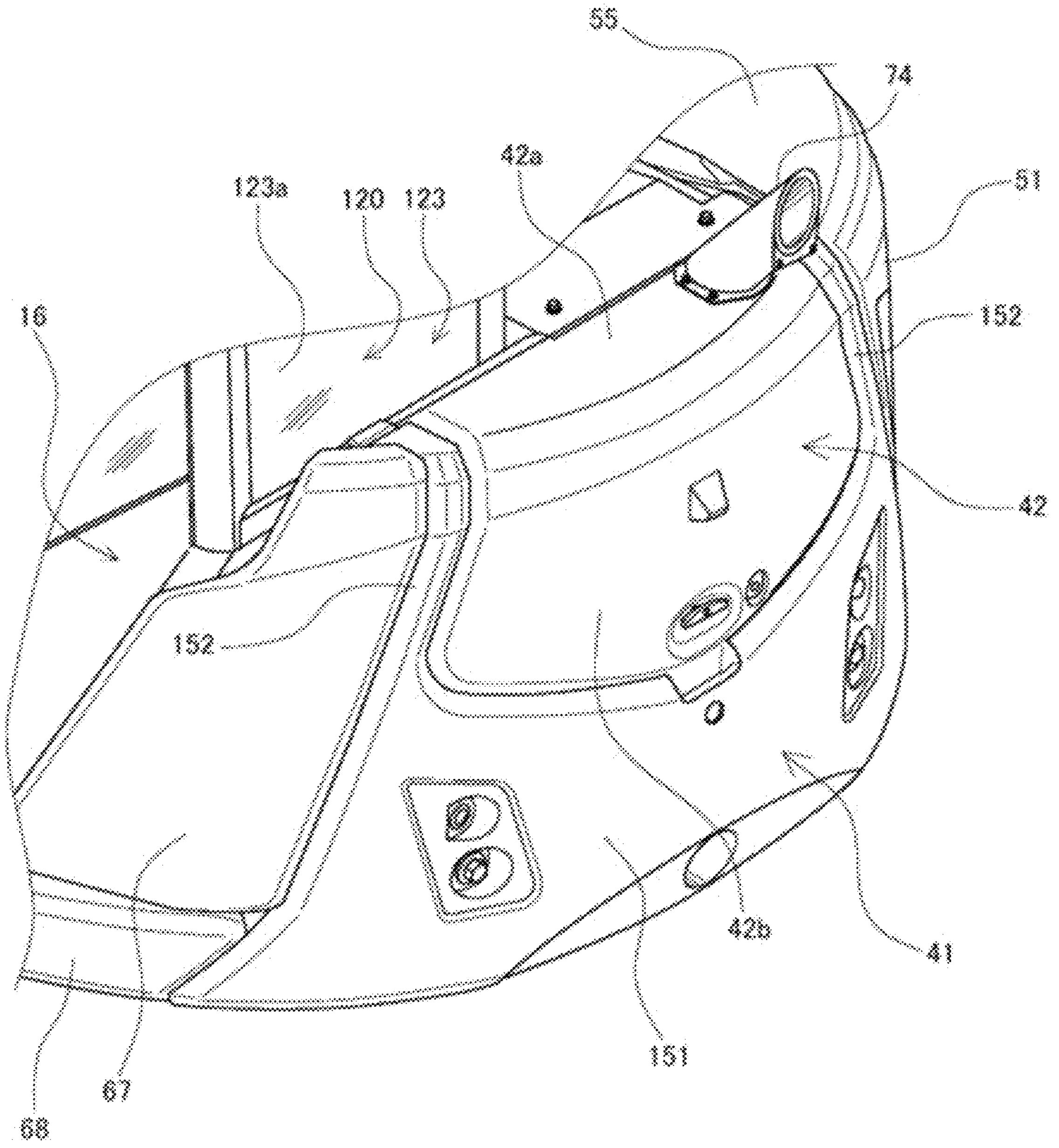
FIG. 7 is a left perspective view of a rear portion of the upper swivel body according to the embodiment of the present disclosure.

The hood 42 is disposed so as to cover the opening portion 150 of the counterweight 41 in an openable and closable manner. As illustrated in FIG. 7, the hood 42 has the upper surface portion 42*a* and a covering main body portion 42*b* which is a rear surface portion and which covers substantially the entire opening portion 150. The hood 42 is disposed so as to be rotatable about a hinge (not illustrated) disposed at a front portion of the upper surface portion 42*a* with the machine body lateral direction as a rotation axis direction. When the hood 42 is rotated upward from a closed state, the opening portion 150 is entirely opened (refer to an arrow B1 in FIG. 1). The hood 42 is disposed so as to be opened to a rotational position at which at least the lower end of the hood 42 is positioned above the upper surface portion 42*a* of the hood 42 in a closed state. Note that, in FIG. 1, the hood 42 in an open state is indicated by a two dot chain line.

The excavation work machine 1 includes, as devices disposed near the engine 12, an alternator 81 driven by rotational power of the output shaft 65 of the engine 12 and a compressor 82 driven by the rotational power of the output shaft 65. Both the alternator 81 and the compressor 82 are disposed on a right side surface portion which is a side surface portion on the output shaft 65 side of the engine 12.

The alternator 81 is driven by the power of the engine 12 to generate and output electric power. The alternator 81 is used as a power source or a generator for storing electricity in a battery.

The compressor 82 is used for an air conditioning unit included in the excavation work machine 1, and is driven by the power of the engine 12 to compress air conditioning gas (refrigerant). The air for air-conditioning generated by the air conditioning unit is supplied in a compression manner through a duct (not illustrated), and is blown out from a plurality of air outlets provided in the cabin 16. The air conditioning unit is disposed below the driver's seat 17.

The alternator 81 is driven by the rotational power of the output shaft 65 of the engine 12 transmitted by a first belt transmission mechanism 91. The first belt transmission mechanism 91 includes an output pulley 93 attached to the output shaft 65, an alternator input pulley 94 disposed on the alternator 81, and a first belt 95 wound around these pulleys.

The output pulley 93 is fixed to the output shaft 65, and rotates integrally with the output shaft 65 with its rotation shaft direction aligned with the axial direction of the output shaft 65. The output pulley 93 is a so-called double pulley and has two outer circumferential grooves adjacent to each other in the rotation shaft direction. The first belt 95 is engaged with the groove on the right side (front side in FIG. 5) of the output pulley 93. The alternator input pulley 94 is disposed on a right side of the alternator 81, and is fixed to the rotation shaft 81*a* of the alternator 81 having an axis direction parallel to the output shaft 65. A rotation shaft direction of the alternator input pulley 94 is aligned with an axial direction of the rotation shaft 81*a* of the alternator 81, and the alternator input pulley 94 rotates integrally with the rotation shaft 81*a*.

A fan pulley 97 for rotationally driving the fan 63 is disposed over the output pulley 93. The fan pulley 97 is disposed on a right side surface portion of the engine 12 so as to be rotatable with respect to a shaft support portion disposed over the output shaft 65 with an axial direction parallel to the output shaft 65. The fan pulley 97 constitutes the first belt transmission mechanism 91 together with the output pulley 93 and the alternator input pulley 94 around which the first belt 95 is wound, and receives the rotational power of the output shaft 65. The fan 63 is disposed so as to rotate integrally with the fan pulley 97, and rotates in conjunction with the rotation of the output shaft 65.

The compressor 82 is driven when receiving transmission of the rotational power of the output shaft 65 of the engine 12 transmitted by a second belt transmission mechanism 92. The second belt transmission mechanism 92 includes the output pulley 93 attached to the output shaft 65, a compressor input pulley 98 disposed on the compressor 82, and a second belt 99 wound around these pulleys.

The second belt 99 is engaged with the groove on the left side (depth side in FIG. 5) of the output pulley 93. That is, in the axial direction of the output shaft 65, the compressor input pulley 98 is positioned on the left side with respect to the alternator input pulley 94, and the second belt 99 is disposed at a position shifted to the left with respect to the first belt 95. The compressor input pulley 98 is disposed on a right side of the compressor 82, and is fixed to a rotation shaft 82*a* of the compressor 82 with an axis direction in parallel to the output shaft 65. A rotation shaft direction of the compressor input pulley 98 is aligned with an axial direction of the rotation shaft 82*a* of the compressor 82, and the compressor input pulley 98 rotates integrally with the rotation shaft 82*a*.

As described above, the excavation work machine 1 includes the engine 12, the hydraulic pump 35 disposed on the left side of the engine 12, and the engine room 30 accommodating the engine 12 and the hydraulic pump 35. In such a configuration, the excavation work machine 1 includes an engine controller 100 for controlling the operation of the engine 12 as an electrical component disposed in the engine room 30.

The engine controller 100 is a device that performs control related to the operation of the engine 12, such as fuel injection control and rotation speed control of the engine 12. As the fuel injection control of the engine 12, for example, control of a fuel injection amount and a fuel injection timing is performed. As the rotation speed control of the engine 12, for example, an engine rotation speed is controlled in accordance with a work load in order to reduce fuel consumption.

The engine controller 100 controls the operation of the engine 12 by driving various actuators, such as a fuel injection valve, based on signals input from various sensors that detect a driving operation performed by an operator, a driving state of the engine 12, and the like. Therefore, the various sensors and the various actuators are connected to the engine controller 100 by cables 101. Hereinafter, an arrangement configuration of the engine controller 100 in the excavation work machine 1 will be described.

Figure 4:
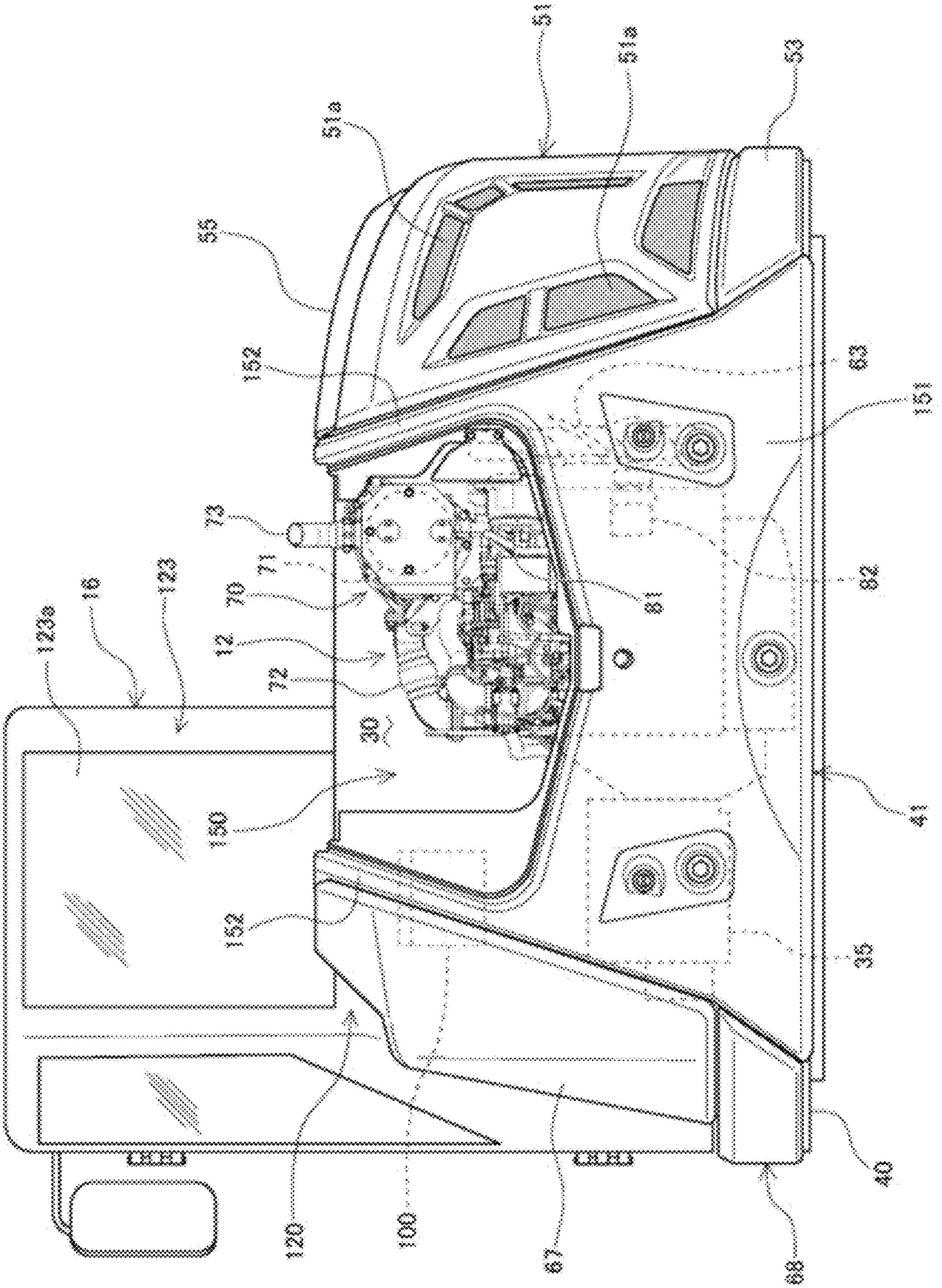
FIG. 4 is a rear view of an upper swivel body according to the embodiment of the present disclosure.
Figure 5:
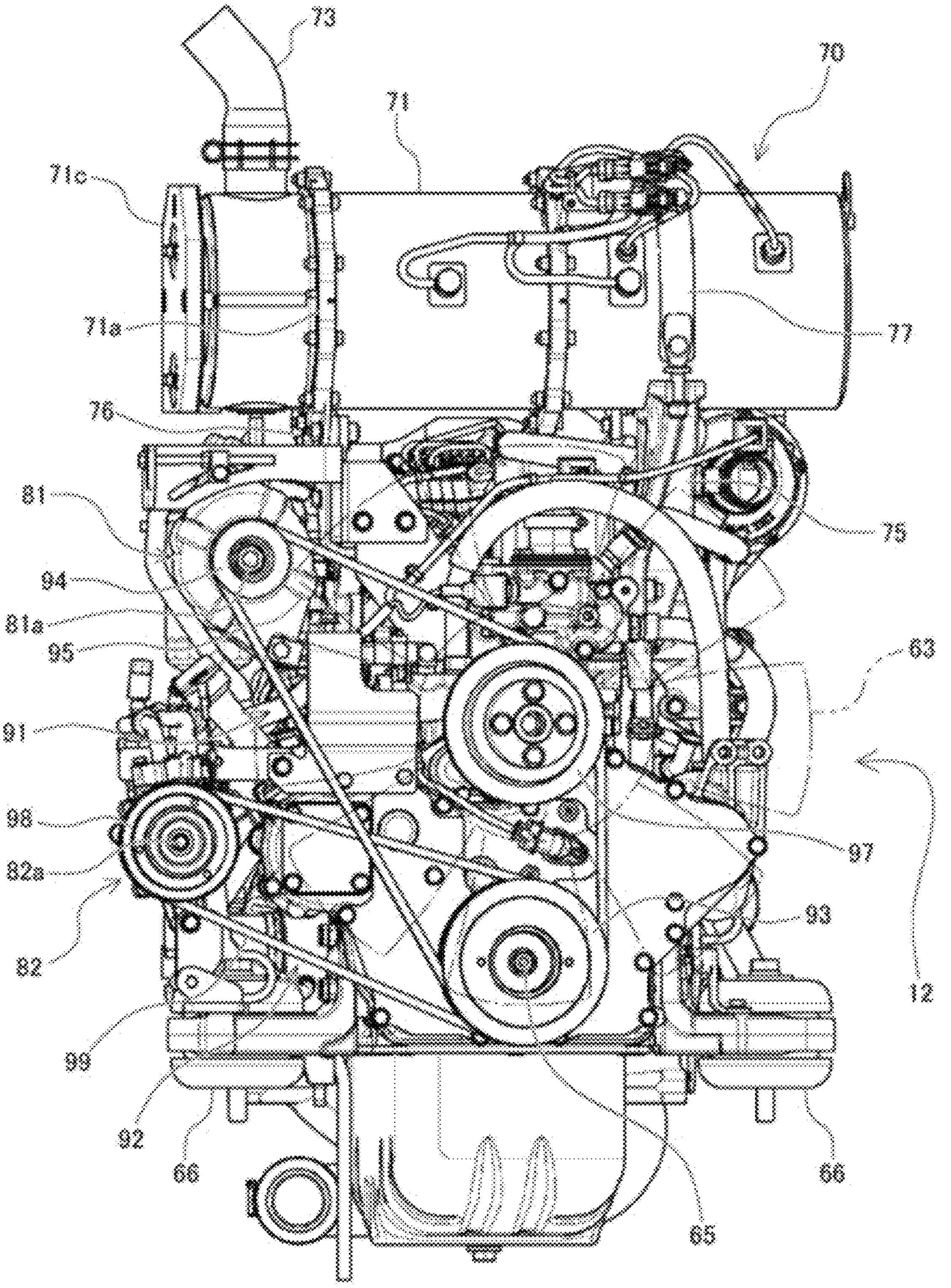
FIG. 5 is a right side view of an engine according to the embodiment of the present disclosure.
Figure 6:
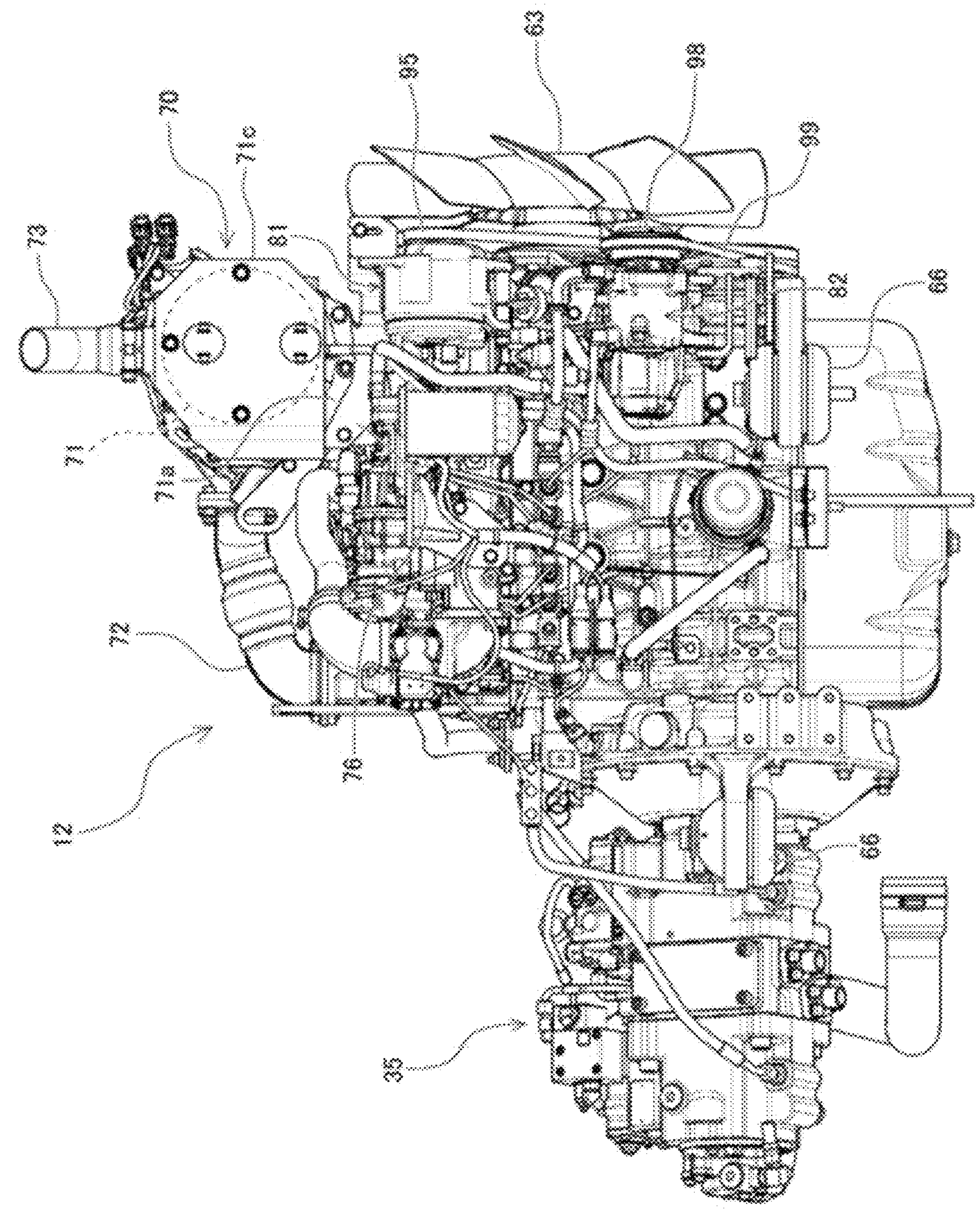
FIG. 6 is a rear view of the engine according to the embodiment of the present disclosure.
Figure 8:
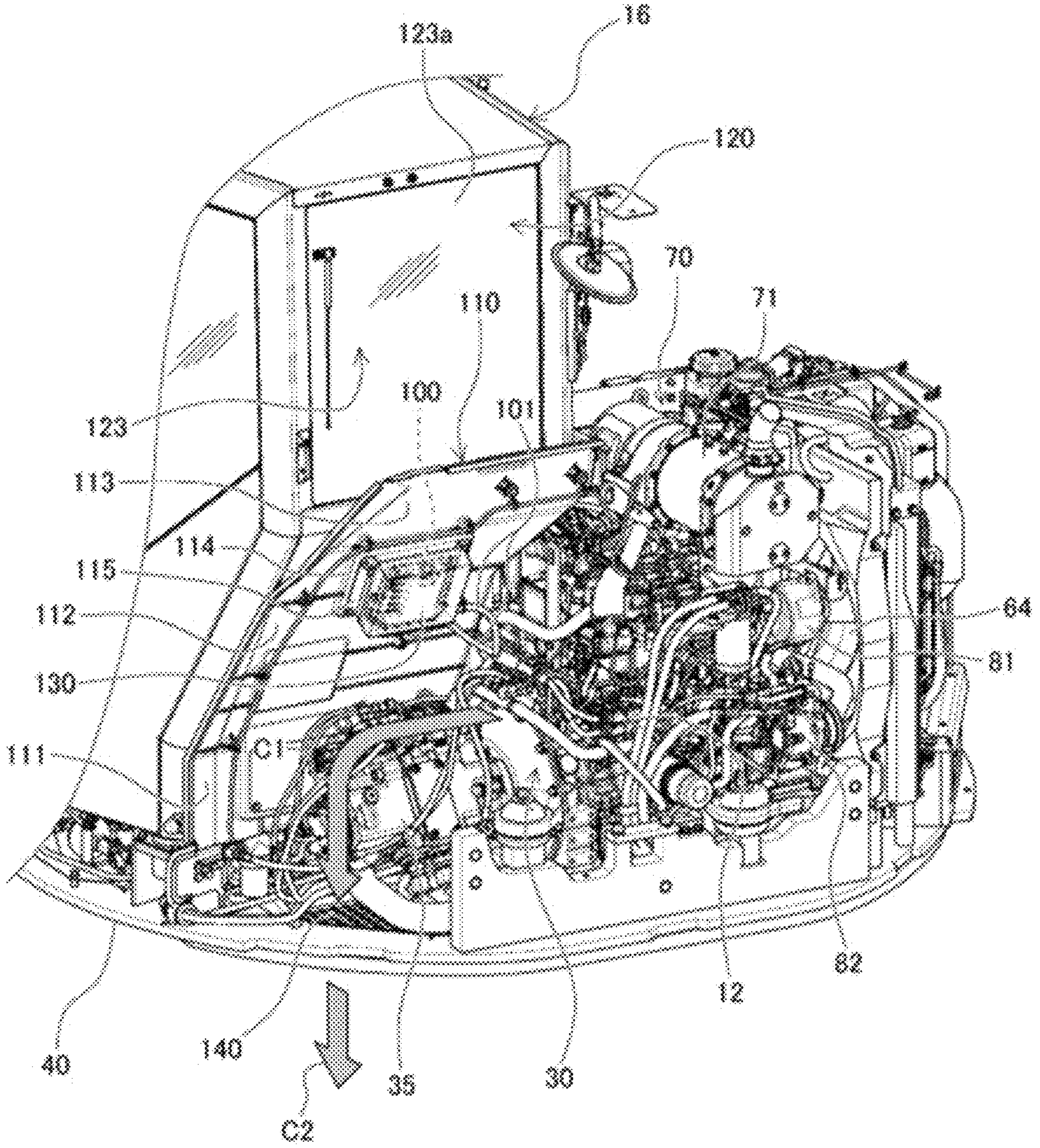
FIG. 8 is a left rear perspective view of an inside of the engine room according to the embodiment of the present disclosure.

As illustrated in FIGS. 4 and 8, the engine controller 100 is disposed above the hydraulic pump 35 in the vertical direction and on the left side of the engine 12 in the engine room 30.

As a device layout in the engine room 30, the hydraulic pump 35 which is a relatively small device is installed in a space on one of the left and right sides (left side) with respect to the engine 12 and the exhaust gas purification device 70 which are relatively bulky, and the operation section 10 in the cabin 16 is disposed on an upper front side of the installation space of the hydraulic pump 35. In the engine room 30, the relatively small hydraulic pump 35 is installed in a lower portion of the engine room 30 at a position on the left side of the engine 12, whereby a space section is secured on the left side of the engine 12 and above the hydraulic pump 35, and the engine controller 100 is disposed in the space portion.

The engine controller 100 is disposed above the hydraulic pump 35 as a whole in the rear view (refer to FIG. 4). That is, with respect to the vertical direction, the engine controller 100 is disposed such that a lower end thereof is positioned above an upper end of the hydraulic pump 35. Note that the engine controller 100 may be disposed such that a part of the lower side thereof overlaps the hydraulic pump 35 in a rear view.

Furthermore, the engine controller 100 is disposed above the hydraulic pump 35 disposed on the left side of the engine 12, so that the engine controller 100 is disposed on the left side which is an arrangement side of the hydraulic pump 35 with respect to the engine 12 in the lateral direction. Furthermore, in the engine room 30, the engine controller 100 is positioned on the left side, which is a side where the cabin 16 is disposed, in the lateral direction, and is positioned below a rear portion of the cabin 16. The engine controller 100 is disposed at a position where the entire engine controller 100 overlaps a lower portion of the cabin 16 in the rear view.

The engine controller 100 is disposed in a state of being attached to an engine room front wall portion 110 which is a wall portion on a front side of the engine room 30. The engine room front wall portion 110 is configured by a plate-shaped member having a predetermined shape, and is disposed so as to partition a front side of a substantially left half portion of the engine room 30 in the lateral direction. The engine room front wall portion 110 is disposed above the base plate 40 so as to be positioned to the left of a front-rear intermediate portion of the engine 12.

The engine room front wall portion 110 is disposed along a cabin rear wall portion 120 which is a wall portion on the rear side of the cabin 16. The cabin 16 has a shape in which an upper portion protrudes rearward with respect to a lower portion on the rear side. The cabin rear wall portion 120 has a predetermined bent shape in a side view so as to form an upper protruding form on the rear side of the cabin 16.

Figure 9:
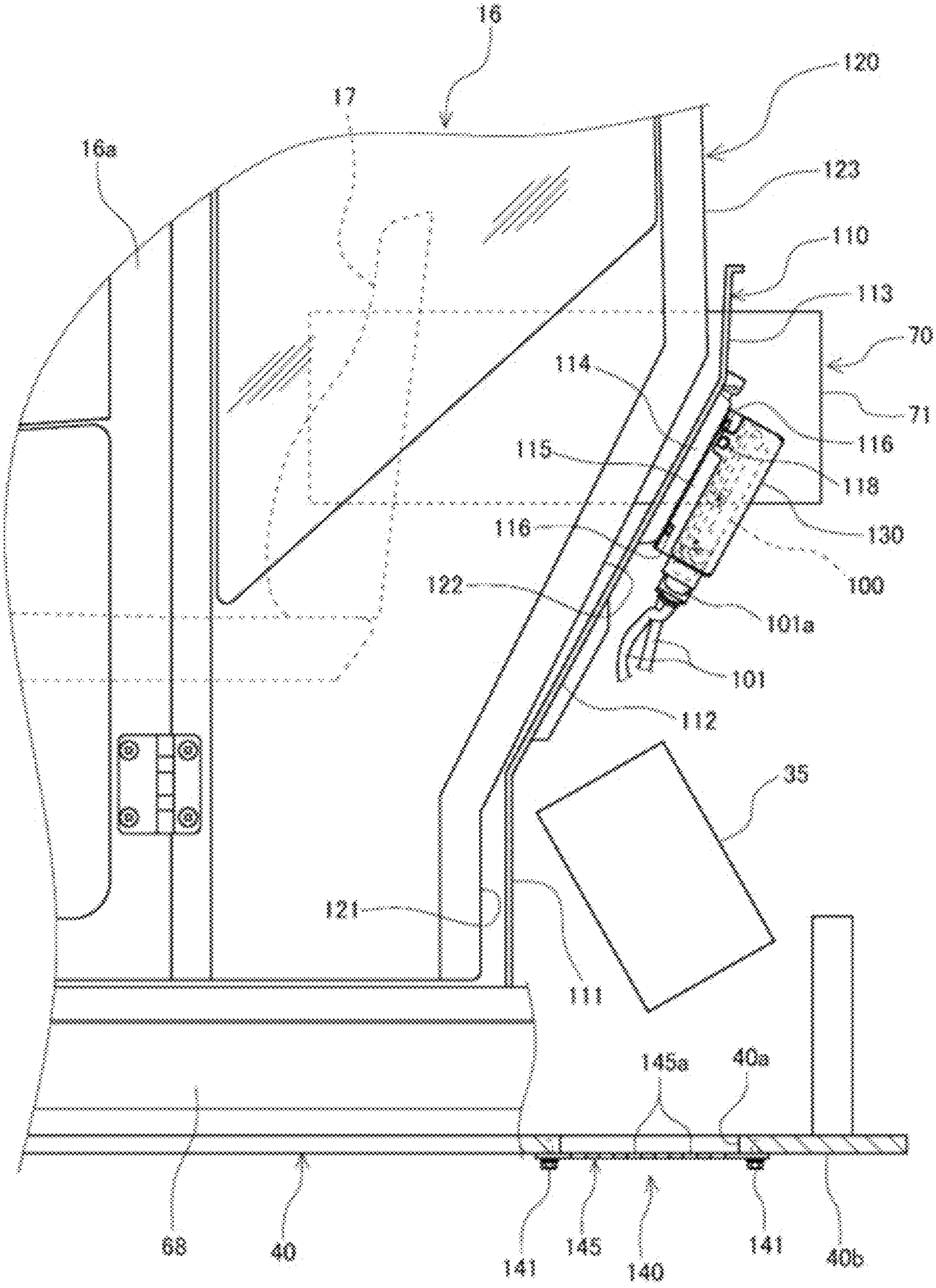
FIG. 9 is a left side partial sectional view of arrangement of an engine controller according to the embodiment of the present disclosure.
Figure 10:
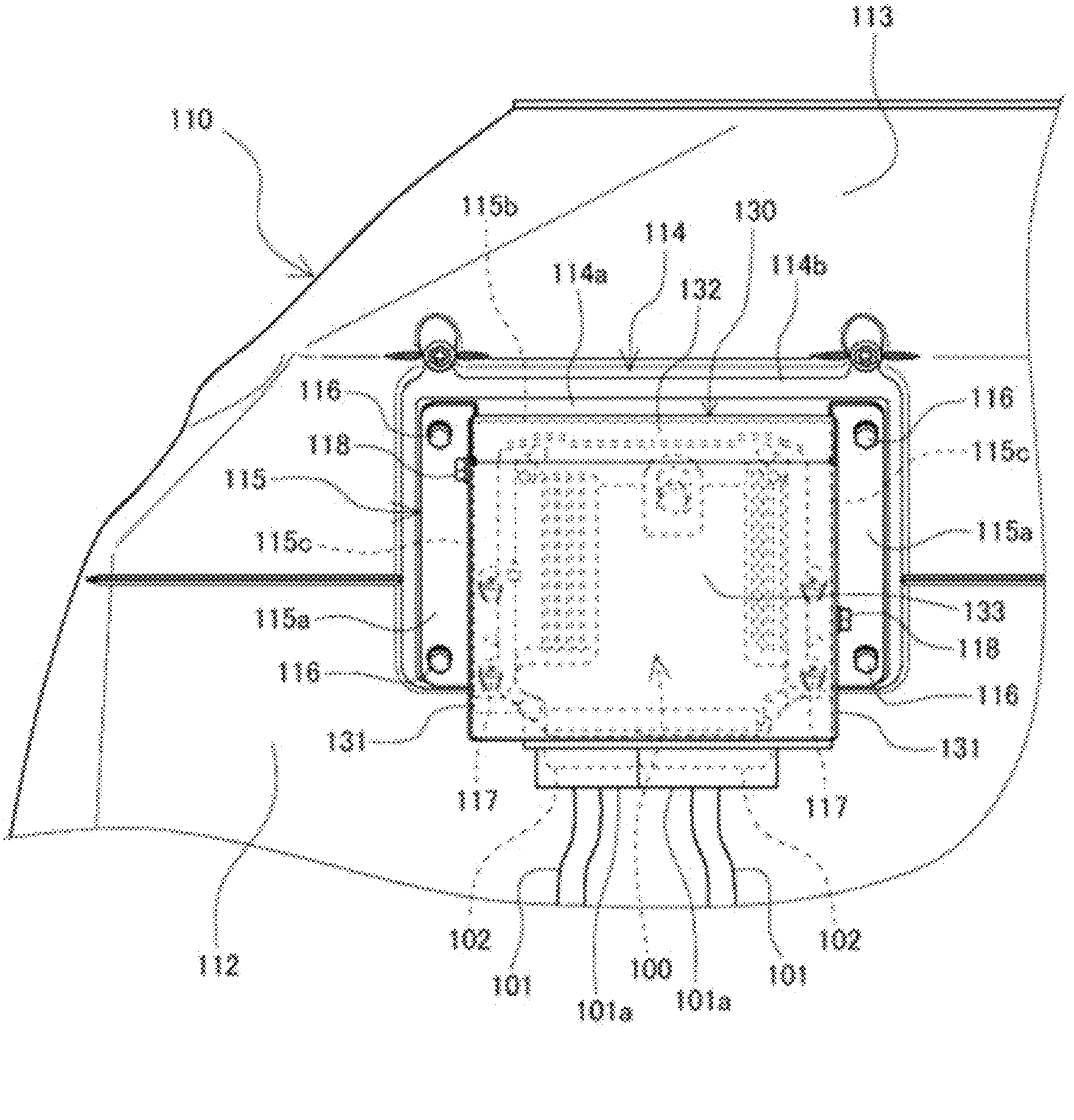
FIG. 10 is a rear view of the engine controller according to an embodiment of the present disclosure.
Figure 11:
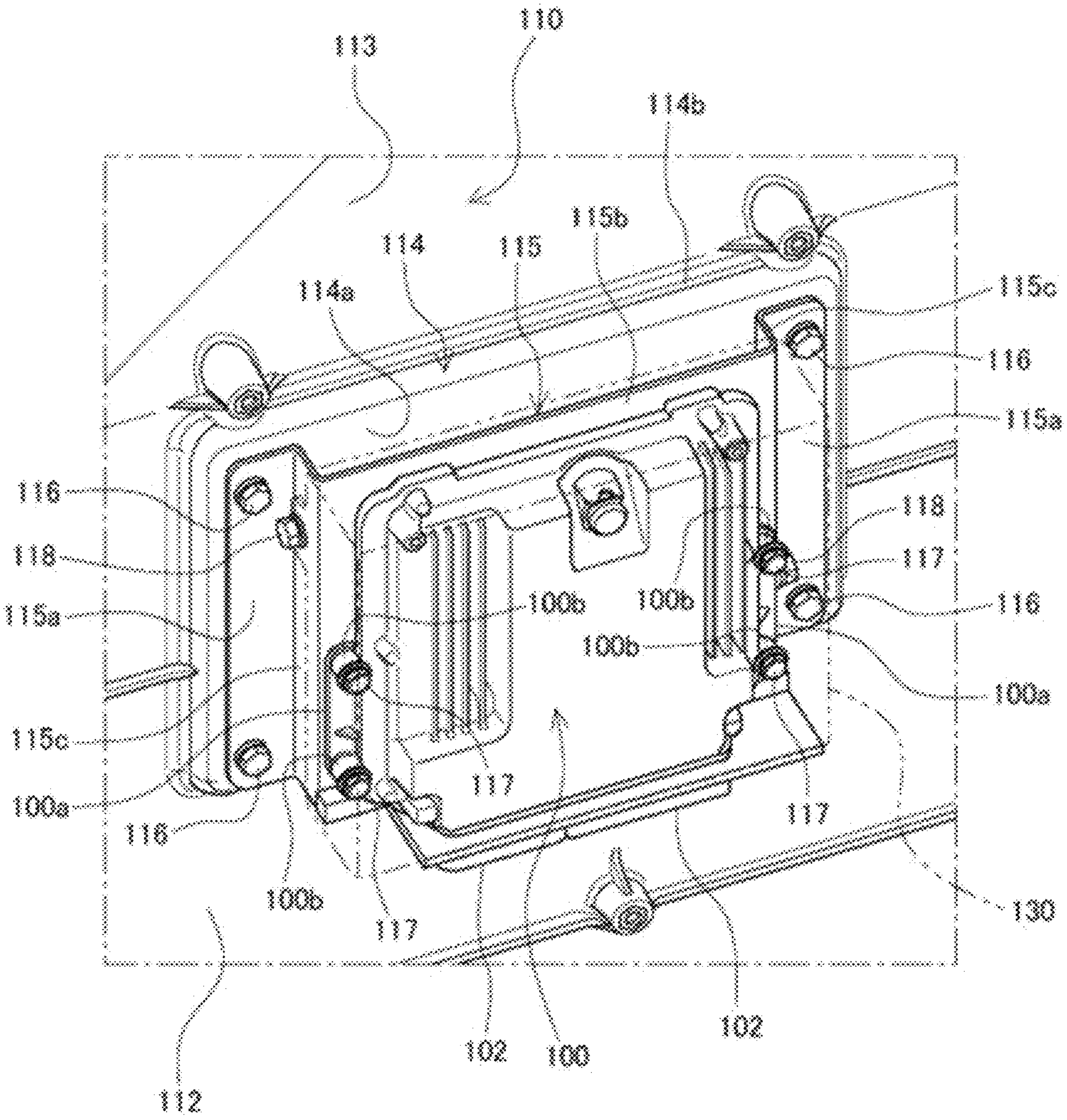
FIG. 11 is a perspective view of the engine controller according to the embodiment of the present disclosure.
Figure 12:
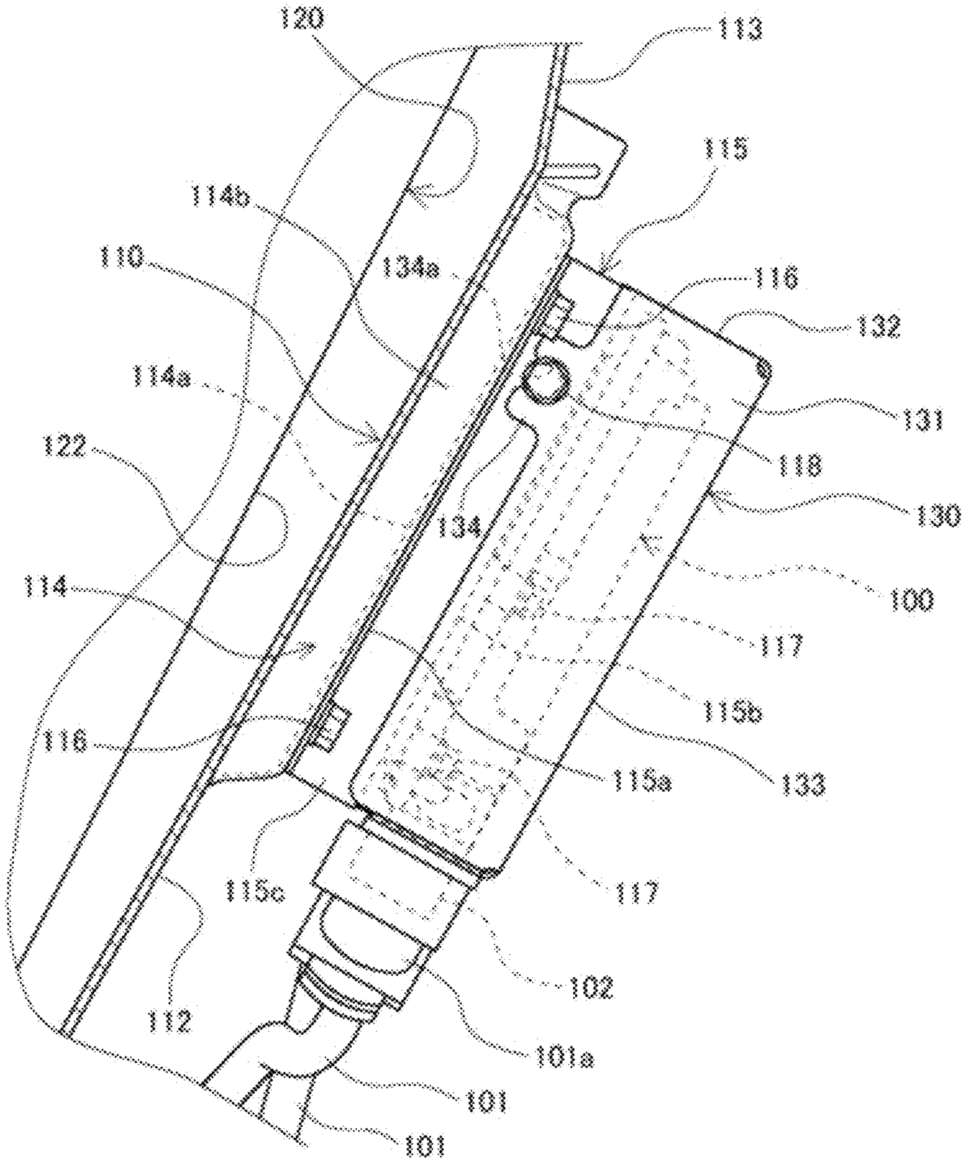
FIG. 12 is a left side view of the engine controller according to the embodiment of the present disclosure.

Specifically, as illustrated in FIG. 9, the cabin rear wall portion 120 includes, in order from the lower side to the upper side, a vertical lower wall surface portion 121, an inclined wall surface portion 122 which is continuous with an upper side of the lower wall surface portion 121, and a vertical upper wall surface portion 123 which is continuous with an upper side of the inclined wall surface portion 122. The lower wall surface portion 121 forms a lower end portion of the cabin rear wall portion 120, and the inclined wall surface portion 122 and the upper wall surface portion 123 are formed to have substantially the same size in the vertical direction. Note that most of the upper wall surface portion 123 is a window portion **123*a* formed of a transparent member, such as glass (refer to FIG. 8**).

The upper wall surface portion 123 is positioned rearward of the lower wall surface portion 121 in the front-rear direction due to the inclination of the inclined wall surface portion 122. The inclined wall surface portion 122 is inclined in a direction from the front side to the rear side from the lower side to the upper side. That is, the inclined wall surface portion 122 forms an inclined surface portion inclined upward toward the rear.

Since the cabin rear wall portion 120 has such a configuration, the engine room front wall portion 110 has a bent form similar to that of the cabin rear wall portion 120 in the side view, and is disposed immediately behind the cabin rear wall portion 120. The engine room front wall portion 110 includes, in order from the lower side to the upper side, a vertical lower side surface portion 111 extending along the lower wall surface portion 121, an inclined surface portion 112 which is continuous with an upper side of the lower side surface portion 111, and a vertical upper side surface portion 113 which is continuous with an upper side of the inclined surface portion 112.

The engine room front wall portion 110 is disposed in a range from a lower end portion of the cabin rear wall portion 120 to a lower portion of the upper wall surface portion 123 in the vertical direction. In the engine room front wall portion 110, an upper end portion of the upper side surface portion 113 is positioned in a lower portion of the upper wall surface portion 123. The engine room front wall portion 110 has a height that is substantially half a height of the entire cabin 16, and is disposed so as to cover substantially half of the lower side of the cabin rear wall portion 120 from the rear side.

The lower side surface portion 111, the inclined surface portion 112, and the upper side surface portion 113 are positioned behind the corresponding wall surface portions, that is, the lower wall surface portion 121, the inclined wall surface portion 122, and the upper wall surface portion 123, respectively, at a slight interval, and are disposed so as to be parallel or substantially parallel to the corresponding wall surface portions in the side view. The upper side surface portion 113 is positioned rearward of the lower side surface portion 111 in the front-rear direction due to the inclination of the inclined surface portion 112. The inclined surface portion 112 is inclined in a direction from the front side to the rear side from the lower side to the upper side. That is, the inclined surface portion 112 forms an inclined surface inclined rearward and upward (forward and downward). An inclination angle of the inclined surface portion 112 with respect to the vertical direction in the side view is, for example, approximately 30 degrees.

The engine controller 100 is attached to the inclined surface portion 112 of the engine room front wall portion 110. The engine controller 100 is attached to an upper portion of the inclined surface portion 112 of the engine room front wall portion 110 at a substantially central portion in the lateral direction.

The engine controller 100 has a substantially rectangular plate-like outer shape and is attached to the inclined surface portion 112 in such a manner that a plate surface of the engine controller 100 extends along the inclined surface portion 112. The engine controller 100 is attached to a mounting seat portion 114, which is a rectangular protruding portion formed on the inclined surface portion 112, via a mounting plate 115.

The mounting seat portion 114 is a portion of the engine room front wall portion 110 formed of a plate-shaped member, which is raised rearward so as to form a recess with respect to a front surface side, and forms a flat mounting surface portion 114*a* positioned rearward in a stepped manner with respect to the other portion of the inclined surface portion 112. The mounting seat portion 114 has a substantially rectangular outer shape whose longitudinal direction is the lateral direction, and includes the mounting surface portion 114*a* and a peripheral wall portion 114*b* disposed along a rectangular outer shape that connects between the other portion of the inclined surface portion 112 and the mounting surface portion 114*a*. The mounting seat portion 114 has a size that includes the entire or substantially the entire outer shape of the engine controller 100 in the plan view (outer shape in a plate surface view).

The mounting plate 115 is a mounting fitting in a form of a bent plate having a so-called hat shape, and is fixed to the mounting surface portion 114*a* of the mounting seat portion 114. The mounting plate 115 has, as the hat-shaped portion, fixing surface portions 115*a* formed on both the left and right sides, a support surface portion 115*b* to which the engine controller 100 is mounted, and left and right side surface portions 115*c* which form right angles together with the fixing surface portions 115*a* and the support surface portion 115*b*.

Each of the left and right fixing surface portions 115*a* of the mounting plate 115 is fixed to the mounting surface portion 114*a* of the mounting seat portion 114 at two portions, that is, upper and lower portions, by bolts 116. The bolts 116 penetrate the fixing surface portion 115*a* and is screwed into a nut portion (not illustrated) disposed on the inclined surface portion 112 of the engine room front wall portion 110. In this way, the mounting plate 115 is fixed to the mounting seat portion 114 at the four positions by the bolts 116 penetrating four corners of the rectangular outer shape. In a state in which the mounting plate 115 is fixed to the mounting seat portion 114, the support surface portion 115*b* is parallel to the mounting surface portion 114*a*.

The engine controller 100 has fixing piece portions 100*a* formed to protrude on both left and right sides of a lower portion of a case forming an exterior thereof, and each of the fixing piece portions 100*a* is fixed to the support surface portion 115*b* of the mounting plate 115 at two portions, that is, upper and lower portions by bolts 117. Each of the fixing piece portions 100*a* has cylindrical boss portions 100*b* through which the bolt 117 penetrates at two portions, that is, upper and lower portions thereof. The bolts 117 that penetrate the boss portions 100*b* are screwed into respective nuts (not illustrated) on a back surface side of the support surface portion 115*b* to fasten and fix the engine controller 100 to the support surface portion 115*b*.

The engine controller 100 is entirely covered with a metal cover 130 made of, for example, a steel plate. The cover 130 is formed in a box shape, and covers the engine controller 100 so as to accommodate the engine controller 100 therein. The cover 130 functions as a heat insulating member for the engine controller 100 so that the engine controller 100 is not directly exposed to heat generated by the engine 12 and the like in the engine room 30.

The cover 130 has left and right side surface portions 131, an upper side surface portion 132, and a rear surface portion 133 facing the upper side of the support surface portion 115*b* of the mounting plate 115. The cover 130 has projecting piece portions 134 projecting forward from the left and right side surface portions 131, and is fixed to the mounting plate 115 by fixing the projecting piece portions 134 to the side surface portions 115*c* with bolts 118. The bolts 118 penetrate the corresponding projecting piece portions 134 and the corresponding side surface portions 115*c*, and are screwed into nuts (not illustrated) inside the corresponding side surface portions 115*c* to fasten and fix the cover 130 to the mounting plate 115. The projecting piece portions 134 are formed on an upper side of the left side surface portion 131 and a lower side of the right side surface portion 131. Each of the projecting piece portions 134 has a recessed cutout portion 134*a* for allowing the bolt 118 to penetrate therethrough (refer to FIG. 12).

A lower side of the cover 130, which is a side opposite to the upper side surface portion 132, is partially opened, and a connector portion 102 to which the engine controller 100 receives connection of the cable 101 protrudes from a lower side to an outside of the cover 130. Specifically, in a state in which the engine controller 100 is covered by the cover 130 from both the left and right sides, the upper side, and the rear side, the connector portion 102 is exposed to the outside of the cover 130 from the lower side, and the connector 101*a* on one end side of the cable 101 is connected to the connector portion 102.

Furthermore, regarding the arrangement of the engine controller 100, the engine controller 100 is arranged on the opposite side to the arrangement side of the heat exchanger 60 with respect to the engine 12. The heat exchanger 60 is disposed on the right of the engine 12 (refer to FIG. 3). Meanwhile, the engine controller 100 is disposed to the left of the engine 12 in plan view. That is, the engine controller 100 is disposed at a position where the engine 12 is interposed between the engine controller 100 and the heat exchanger 60 in the left-right direction.

Figure 13:
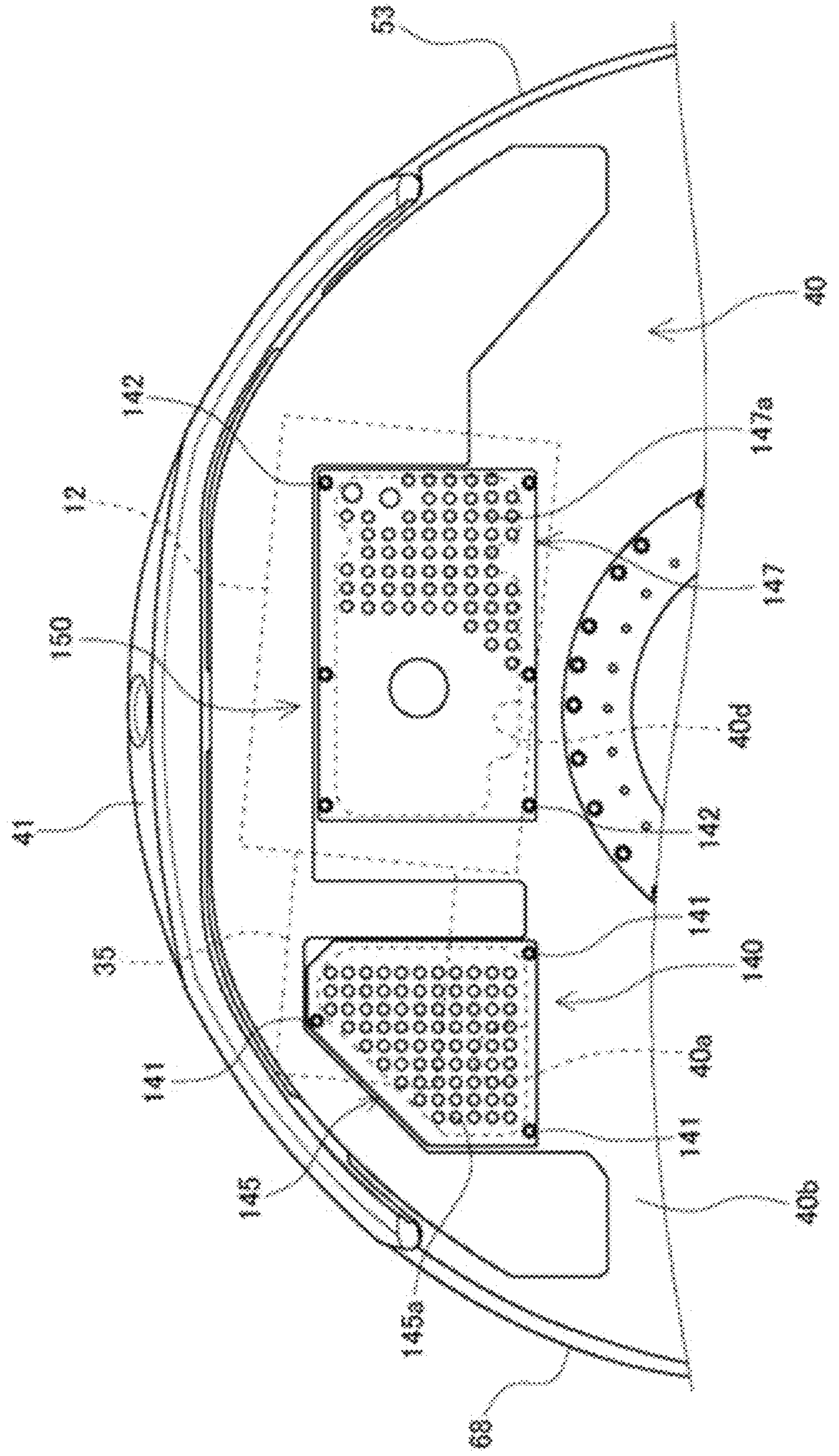
FIG. 13 is a bottom view of a rear portion of an upper swivel body according to the embodiment of the present disclosure.

In addition, in the configuration in which the heat exchanger 60 includes the fan 63 for taking in outside air, as illustrated in FIGS. 8 and 13, an opening portion 140 that allows an inside and an outside of the engine room 30 to communicate with each other is provided below the hydraulic pump 35. The opening portion 140 is provided as an opening portion that penetrates the base plate 40 in the vertical direction, which is a plate thickness direction of the base plate 40.

As illustrated in FIGS. 9 and 13, the opening portion 140 has a configuration in which a through opening 40*a* formed in a predetermined range in the base plate 40 is closed by a perforated plate 145. The perforated plate 145 is a flat plate formed with a plurality of circular holes 145*a* in a predetermined arrangement. The perforated plate 145 is fixed to the base plate 40 at a plurality of portions (three places) by bolts 141 in a state in which a group of the holes 145*a* is applied to the opening 40*a* from a lower side while a lower surface 40*b* of the base plate 40 serves as a contact surface so that the group of the holes 145*a* is positioned in an opening range of the opening 40*a*. The bolt 141 is screwed into the base plate 40 through a peripheral portion of the perforated plate 145.

As illustrated in FIG. 13, the opening portion 140 is provided on a left side of the rear portion of the base plate 40. The opening 40*a* of the opening portion 140 has an opening shape in which a corner portion on a left rear side (left upper side in FIG. 13) of a rectangular shape is chamfered in an inclined shape along an arc-shaped outer shape of a rear portion of the upper swivel body in a bottom view. The perforated plate 145 has a shape similar to the opening shape of the opening 40*a*, has external dimensions slightly larger than the opening 40*a*, and is disposed so as to close the entire opening 40*a*.

The opening portion 140 is provided so that at least a part of a formation portion of a penetration portion for communicating the engine room 30 with the outside by the opening 40*a* of the base plate 40 and the holes 145*a* of the perforated plate 145 is overlapped with a range of an outer shape in a bottom surface view of the hydraulic pump 35. In this embodiment, the opening portion 140 is provided such that a rear portion thereof (an upper portion in FIG. 13) overlaps a substantially half portion of a left side of the hydraulic pump 35. Note that the configuration, the opening shape, the opening range, and the like of the opening portion 140 are not particularly limited. The opening portion 140 may have, for example, a plurality of slit-like opening shapes.

Furthermore, as illustrated in FIG. 13, an opening portion 150 for communication between the inside and the outside of the engine room 30 is provided below the engine 12. The opening portion 150 has a configuration similar to that of the opening portion 140 below the hydraulic pump 35. That is, the opening portion 150 has a configuration in which a through opening 40*d* formed in a predetermined range of the base plate 40 is closed by a perforated plate 147 having a plurality of circular holes 147*a* formed therein. The perforated plate 147 is fixed at a plurality of portions (six portions) by bolts 142 which are screwed into the base plate 40 through a peripheral edge portion of the perforated plate 145 in a state of being applied to the opening 40*d* from the lower side.

The opening portion 150 is provided at a position to the right of the opening portion 140 and at a central portion in the lateral direction of the rear portion of the base plate 40. The opening 40*d* of the opening portion 150 has a substantially rectangular opening shape whose longitudinal direction is the lateral direction. The perforated plate 147 has an outer size slightly larger than the opening 40*d* and is disposed so as to close the entire opening 40*d*.

The opening portion 150 is provided so that at least a part of a formation portion of a penetration portion for communicating the engine room 30 with the outside by the opening 40*d* of the base plate 40 and the holes 147*a* of the perforated plate 147 is overlapped with a range of an outer shape in a bottom surface view of the engine 12. In this embodiment, as illustrated in FIG. 13, the opening portion 150 is provided such that a right portion thereof overlaps with a substantially right half portion of the engine 12. Note that the configuration, the opening shape, the opening range, and the like of the opening portion 150 are not particularly limited.

Furthermore, the engine controller 100 is disposed on a left side of the exhaust gas purification device 70. As illustrated in FIG. 4, the exhaust gas purification device 70 is disposed in an upper portion of the engine room 30 at a position on a right side relative to a lateral center of the machine body, and the engine controller 100 is disposed at a position on a left side of the DPF case 71 of the exhaust gas purification device 70 in the rear view.

Furthermore, as illustrated in FIG. 9, the engine controller 100 is disposed at a position where a major portion of an upper side thereof overlaps with a rear portion of the DPF case 71 in a left side view. The engine controller 100 is disposed such that the entire engine controller 100 is positioned within a range of a length of the DPF case 71 in the front-rear direction.

According to the excavation work machine 1 of this embodiment described above, comfort in the operation section 10 is secured and the engine controller 100 can be efficiently disposed in the engine room 30 while favorable maintainability is attained.

The engine controller 100 is disposed above the hydraulic pump 35 in the vertical direction and on a side of the engine 12 in the engine room 30. With this configuration, for example, compared to a configuration in which the engine controller 100 is disposed inside the cabin 16, a space for the operation section 10 is not reduced by an installation space of the engine controller 100, and thus the space for the operation section 10 is easily secured and a comfortable operation space can be realized. For example, in the operation section 10, a space for reclining the driver's seat 17 can be easily secured, and comfort can be attained.

In particular, in a relatively small excavator, such as the excavation work machine 1, the spaces for the operation section 10 and the engine room 30 are limited. Therefore, according to the arrangement configuration of the engine controller 100 according to this embodiment, reduction of the space for the operation section 10 can be efficiently suppressed and favorable maintainability can be attained by arranging the engine controller 100 in the engine room 30.

Furthermore, since the engine controller 100 is a device connected to the engine 12 through the cable 101, the engine controller 100 can be disposed close to the engine 12 by arranging the engine controller 100 in the engine room 30. Accordingly, for example, as compared with the configuration in which the engine controller 100 is disposed in the cabin 16, wiring of the cable 101 can be shortened, and therefore, a wiring structure related to the engine controller 100 can be simplified and maintainability and connectivity with related devices can be improved. Furthermore, good workability can be obtained in connection work of the wiring related to the engine controller 100. Moreover, by shortening the wiring, noise can be reduced, and the reliability of the control of the engine 12 by the engine controller 100 can be improved.

In addition, for example, in the case of the configuration in which the engine controller 100 is disposed inside the cabin 16, it is necessary to secure a passage for extending the cable 101 to the engine room 30 outside the cabin 16. A portion corresponding to the passage for extending the cable 101 serves as a communication portion between the cabin 16 and the engine room 30. Therefore, the passage portion may increase an adverse effect of noise, such as an engine sound and a fan sound generated in the engine room 30, in the inside of the cabin 16, or reduce an effect of air conditioning in the cabin 16, and cause a decrease in comfort in the operation section 10. In this regard, by disposing the engine controller 100 in the engine room 30, isolation between the inside of the cabin 16 and the engine room 30 can be enhanced and the comfort of the operation section 10 can be ensured.

Furthermore, in the engine room 30, the engine controller 100 is arranged above the hydraulic pump 35 positioned on the left side of the engine 12, so that the engine controller 100 can be arranged at a position away from the engine 12 as a heat source. As a result, an adverse effect of heat on the engine controller 100 can be reduced, the operability of the engine controller 100 can be secured, and the engine controller 100 can be efficiently disposed by using the space above the hydraulic pump 35 in the engine room 30.

The engine controller 100 is disposed on the opposite side of the heat exchanger 60 with respect to the engine 12. With this configuration, the air taken in from the outside by the fan 63 in the heat exchanger 60 can suppress stagnation of the air around the engine controller 100, and a cooling action can be obtained. Therefore, the adverse effect of the heat on the engine controller 100 can be reduced.

Furthermore, the fan 63 blows air toward the engine 12. With this configuration, the engine controller 100 can be positioned on a downstream side of the flow of the air taken in from the outside by the fan 63 in the heat exchanger 60, and the air can be made to flow along the engine controller 100. Thus, the air taken in from the outside can be applied to the engine controller 100, and retention of the air around the engine controller 100 can be efficiently suppressed. Therefore, the cooling action can be enhanced, and the adverse effect of the heat on the engine controller 100 can be effectively reduced.

Furthermore, the opening portion 140 for communicating the engine room 30 with the outside is provided below the hydraulic pump 35. With this configuration, a flow of the air taken into the engine room 30 by the fan 63 can be efficiently formed.

Specifically, as illustrated in FIG. 8, the air taken into the engine room 30 from the right side of the machine body by the fan 63 passes around the engine 12, flows leftward in the engine room 30, passes through the space between the hydraulic pump 35 and the engine controller 100 (refer to an arrow mark C1), flows downward while hitting an inside of the left rear cover 67 and the like, passes through the opening portion 140, and flows outside the engine room 30 (refer to an arrow mark C2). With this air flow, the cooling air flowing on a surface of the engine controller 100 can be efficiently formed, and the adverse effect of heat on the engine controller 100 can be effectively reduced.

Furthermore, the opening portion 150 for communicating the engine room 30 with the outside is provided below the engine 12. With this configuration, the cooling air flowing around the engine 12 can be efficiently formed, and the cooling effect on the engine 12 can be improved. Therefore, the adverse effect of heat on the engine controller 100 using the engine 12 as a heat source can be effectively reduced.

Furthermore, the inside of the engine room 30 is partially communicated with the outside with a predetermined opening area of the opening portions 140 and 150. With this configuration, by adjusting the positions and the areas of the opening portions 140 and 150, it is possible to suppress leakage of noise from the engine room 30 to the outside and to suppress entry of dust and the like into the engine room 30 while forming an efficient flow of air in the engine room 30.

In addition, a hydraulic oil tank 15 that stores oil pumped by the hydraulic pump 35 is disposed in front of the engine 12 in the front-rear direction. Specifically, the hydraulic oil tank 15 is disposed at a position in front of the engine 12 in the tank chamber 20 provided on a front side opposite to a side where the engine controller 100 is disposed with respect to the engine room 30. With this configuration, the hydraulic oil tank 15, which has a relatively high temperature due to the high-temperature hydraulic oil, may be disposed at a position away from the engine controller 100 via the engine 12. In addition, an increase in the temperature of the engine room 30 caused by the hydraulic oil tank 15 as a heat source may be suppressed. For these reasons, the adverse effect of heat on the engine controller 100 disposed in the engine room 30 can be reduced.

Furthermore, the engine controller 100 is disposed on a left side of the exhaust gas purification device 70 in the engine room 30. With this configuration, the engine controller 100 may be disposed at a position away from the exhaust gas purification device 70 having a relatively high temperature in the engine room 30, and thus the adverse effect of heat on the engine controller 100 can be reduced.

In particular, in this embodiment, since the DPF case 71 and the engine controller 100 are disposed at positions spaced apart from each other on opposite sides in the lateral direction relative to a center position in the lateral direction at a height position above the engine 12 in the engine room 30, a distance between the DPF case 71 and the engine controller 100 can be secured via a space portion above the engine 12. This makes it possible to effectively reduce the adverse effect of heat of the DPF case 71, which is a heat source, on the engine controller 100.

Furthermore, the engine controller 100 is disposed in a state of being attached to the inclined surface portion 112 of the engine room front wall portion 110. With this configuration, as compared with a configuration in which the engine controller 100 is disposed on a vertical wall surface, for example, the engine controller 100 can be easily installed at a position where a flow of the cooling air taken into the engine room 30 can be efficiently formed, and the adverse effect of heat on the engine controller 100 can be effectively reduced.

In addition, since an installation surface portion of the engine controller 100 is formed as the inclined surface portion 112 inclined rearward and upward together with the inclined wall surface portion 122 of the cabin rear wall portion 120 of the cabin 16, it is easy to secure a space for reclining the driver's seat 17 in the cabin 16. Thus, a movable range of a backrest portion by reclining of the driver's seat 17 can be increased, and a comfortable operation space can be realized.

Furthermore, the engine controller 100 is disposed as an electrical component arranged at a position on the left side of the engine 12 and above the hydraulic pump 35 in the engine room 30. With this configuration, since the engine controller 100 is connected to the engine 12 via the cable 101, a configuration suitable for simplification of a wiring structure, maintainability, connectivity with related equipment, and the like, can be realized when compared with a case where the other electrical components included in the excavation work machine 1 are targets.

The work machine according to the present disclosure described in the embodiment above is not limited to the above-mentioned embodiment, and various modes can be adopted to the extent within the scope of the gist of the present disclosure.

In the above-described embodiment, the heat exchanger 60 is configured to cool both the cooling water of the engine 12 and the hydraulic oil pumped by the hydraulic pump 35, but the cooling portion according to the present technique may be configured to cool any one of the cooling water of the engine 12 and the hydraulic oil pumped by the hydraulic pump 35.

Furthermore, in the above-described embodiment, the engine controller 100 is taken as an example of the electrical component, but the electrical component according to the present technique is not particularly limited. Examples of the electrical component according to the present technique include, in addition to the engine controller 100, other controllers, such as a controller for controlling driving of an actuator of a hydraulic system, and a relay box accommodating a plurality of relays constituting an electrical system for the electrical component (for example, an electromagnetically controlled control valve, various sensors, such as a temperature sensor for hydraulic oil, and a starter motor of an engine) included in the excavation work machine 1.

The present technique may have the following configurations. Note that the configurations described below can be selected, omitted, and arbitrary combined.

(1)

A work machine comprising:

an engine;

a hydraulic pump disposed on a side of the engine;

an engine room that accommodates the engine and the hydraulic pump; and an electrical component included in the engine room and disposed above the hydraulic pump in a vertical direction and on a side of the engine.

(2)

The work machine according to (1) above, further comprising:

a cooling portion that cools at least one of cooling water of the engine and oil pumped by the hydraulic pump, wherein the electrical component is disposed on a side opposite to a side on which the cooling portion is disposed with respect to the engine.

(3)

The work machine according to (2) above, wherein the cooling portion includes a fan that sends air toward the engine.

(4)

The work machine according to (3) above, wherein an opening portion that allows an inside and an outside of the engine room to communicate with each other is provided below the hydraulic pump.

(5)

The work machine according to any one of (1) to (4) above, wherein a tank that stores the oil pumped by the hydraulic pump is disposed in front of the engine in a front-rear direction.

(6)

The work machine according to any one of (1) to (5) above, further comprising:

an exhaust treatment device that is disposed above the engine and treats exhaust gas discharged from the engine, wherein the electrical component is disposed on a side near the exhaust treatment device.

(7)

The work machine according to any one of (1) to (6) above, wherein a wall portion on a front side of the engine room has an inclined surface portion inclined in a direction from a front side to a rear side from a lower side to an upper side, and the electrical component is attached to the inclined surface portion.

(8)

The work machine according to any one of (1) to (7) above, wherein the electrical component is an engine controller that controls operation of the engine.

REFERENCE SIGNS LIST

1 excavation work machine (work machine)
12 engine
15 hydraulic oil tank (tank)
16 cabin
30 engine room
35 hydraulic pump
60 heat exchanger (cooling portion)
63 fan
70 exhaust gas purification device (exhaust treatment device)
71 DPF case
100 engine controller (electrical component)
110 engine room front wall portion
112 inclined surface portion
140 opening portion

The invention claimed is:

1. A work machine comprising:

an engine;

a hydraulic pump disposed on a side of the engine;

an engine room that accommodates the engine and the hydraulic pump;

an electrical component included in the engine room and disposed above the hydraulic pump in a vertical direction and on a side of the engine;

a cabin located forward of the engine room; and an engine room front wall portion located rearward of the cabin, wherein the front wall portion has an inclined surface portion inclined in a direction from a front side to a rear side from a lower side to an upper side, and the electrical component is attached to the inclined surface portion.

2. The work machine according to claim 1, further comprising:

a cooling portion that cools at least one of cooling water of the engine and oil pumped by the hydraulic pump, wherein the electrical component is disposed on a side opposite to a side on which the cooling portion is disposed with respect to the engine.

3. The work machine according to claim 2, wherein the cooling portion includes a fan that sends air toward the engine.

4. The work machine according to claim 3, wherein an opening portion that allows an inside and an outside of the engine room to communicate with each other is provided below the hydraulic pump.

5. The work machine according to claim 1, wherein a tank that stores the oil pumped by the hydraulic pump is disposed in front of the engine in a front-rear direction.

6. The work machine according to claim 1, further comprising:

an exhaust treatment device that is disposed above the engine and treats exhaust gas discharged from the engine, wherein the electrical component is disposed on a left side of the exhaust treatment device relative to a lateral center of the work machine.

7. The work machine according to claim 1, wherein the electrical component is an engine controller that controls operation of the engine.

8. The work machine according to claim 1, wherein the engine room front wall portion is provided across a lateral direction of a rear portion of the cabin.

9. The work machine according to claim 8, wherein the engine room front wall portion is disposed at a position overlapping with the hydraulic pump in a plan view.

10. The work machine according to claim 8, wherein the engine room front wall portion is provided along a rear wall portion of the cabin.

11. The work machine according to claim 8, wherein the engine room front wall portion has a lower surface portion, the inclined surface portion connected to an upper side of the lower surface portion, and an upper surface portion connected to an upper side of the inclined surface portion.

* * * * *